United States Patent
Moss et al.

(10) Patent No.: US 9,784,033 B2
(45) Date of Patent: *Oct. 10, 2017

(54) LADDERS, LADDER COMPONENTS AND RELATED METHODS

(71) Applicant: Wing Enterprises, Incorporated, Springville, UT (US)

(72) Inventors: N. Ryan Moss, Mapleton, UT (US); Ryan Crawford, Spanish Fork, UT (US); Keith Emmel, Orem, UT (US)

(73) Assignee: Wing Enterprises, Incorporated, Springville, UT (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/886,566

(22) Filed: Oct. 19, 2015

(65) Prior Publication Data

US 2016/0138335 A1    May 19, 2016

Related U.S. Application Data

(63) Continuation of application No. 13/480,897, filed on May 25, 2012, now Pat. No. 9,163,455, which is a
(Continued)

(51) Int. Cl.
*E06C 1/30* (2006.01)
*E06C 7/06* (2006.01)
(Continued)

(52) U.S. Cl.
CPC .................. *E06C 1/18* (2013.01); *E06C 1/22* (2013.01); *E06C 7/04* (2013.01); *E06C 7/14* (2013.01);
(Continued)

(58) Field of Classification Search
CPC ... F16B 7/105; E06C 7/00; E06C 7/04; E06C 7/50; E06C 1/22; E06C 1/30; E06C 1/12;
(Continued)

(56) References Cited

U.S. PATENT DOCUMENTS

| | | | |
|---|---|---|---|
| 600,196 | A | 3/1898 | Duryea |
| 607,808 | A | 7/1898 | Tiefel |

(Continued)

FOREIGN PATENT DOCUMENTS

| | | |
|---|---|---|
| CN | 2081878 U | 7/1991 |
| CN | 2674056 Y | 1/2005 |

(Continued)

OTHER PUBLICATIONS

Supplementary European Search Report for correspoindng European Patent Application No. 09718143, mailed Jul. 7, 2014.
(Continued)

*Primary Examiner* — Daniel Cahn
(74) *Attorney, Agent, or Firm* — Holland & Hart

(57) ABSTRACT

Ladders, ladder components and related methods are provided. In some embodiments, adjustable stepladders are provided which include locking mechanisms that enable height adjustment of the ladder through application of a force towards the rails of the ladder. In other embodiments, spreader mechanisms are provided with cross bracing located and configured to provide additional stability to the ladder while also incorporating a handle that enables efficient collapsing of the ladder while reducing the potential of pinching ones hands or fingers. In another embodiment, a device is provided for selective coupling with the ladder that includes a support or safety rail and an adjustable tray. The device may be coupled with the ladder in a number of different positions including a stowed position. In another embodiment, a hinge assembly is provided having a magnetic component configured to be magnetically coupled with and temporarily store an object on the ladder.

9 Claims, 23 Drawing Sheets

Related U.S. Application Data continuation of application No. 12/399,815, filed on Mar. 6, 2009, now Pat. No. 8,186,481.

(60) Provisional application No. 61/068,656, filed on Mar. 7, 2008.

(51) Int. Cl.

| | | |
|---|---|---|
| *E06C 7/50* | (2006.01) | |
| *E06C 1/18* | (2006.01) | |
| *E06C 7/04* | (2006.01) | |
| *F16B 7/10* | (2006.01) | |
| *E06C 7/14* | (2006.01) | |
| *E06C 1/22* | (2006.01) | |
| *E06C 7/16* | (2006.01) | |

(52) U.S. Cl.
CPC ............. *E06C 7/16* (2013.01); *E06C 7/50* (2013.01); *F16B 7/105* (2013.01); *Y10T 16/522* (2015.01); *Y10T 29/49826* (2015.01)

(58) Field of Classification Search
CPC . E04G 25/04; E04G 2025/045; E04G 25/061; E04G 25/06
USPC ........................................................ 403/109.3
See application file for complete search history.

(56) References Cited

U.S. PATENT DOCUMENTS

| | | | |
|---|---|---|---|
| 622,831 A | 4/1899 | Wallach et al. | |
| 656,946 A | 8/1900 | Corduan et al. | |
| 933,816 A | 9/1909 | Bartos et al. | |
| 992,915 A | 5/1911 | Shaw | |
| 1,068,805 A | 7/1913 | Mosiman | |
| 1,379,419 A | 5/1921 | Reeves | |
| 1,397,280 A | 11/1921 | Graf Hubert M. | |
| 2,167,157 A | 7/1939 | Muehlberg Karl O. | |
| 2,827,216 A | 3/1958 | Napolitano Leonard B. | |
| 2,937,842 A | 5/1960 | Meek | |
| 2,975,857 A * | 3/1961 | Suroff | E06C 1/22 182/166 |
| 3,057,431 A | 10/1962 | George | |
| 3,858,684 A | 1/1975 | Goings et al. | |
| 4,210,224 A | 7/1980 | Kummerlin et al. | |
| 4,226,302 A | 10/1980 | Roche | |
| 4,407,045 A * | 10/1983 | Boothe | E05D 11/1007 16/327 |
| 4,574,918 A | 3/1986 | Marques | |
| 4,754,845 A | 7/1988 | Baker | |
| 4,826,059 A | 5/1989 | Bosch et al. | |
| 5,074,377 A | 12/1991 | Krause | |
| 5,098,052 A | 3/1992 | Beck | |
| 5,120,013 A | 6/1992 | Sweeney | |
| 5,203,596 A | 4/1993 | Stevens | |
| D341,895 S | 11/1993 | Idh | |
| 5,353,892 A * | 10/1994 | Lu | E06C 1/32 16/328 |
| 5,495,915 A * | 3/1996 | Weston | E06C 1/125 182/195 |
| 5,577,574 A | 11/1996 | Joseph | |
| D388,882 S | 1/1998 | Kain | |
| 5,722,507 A | 3/1998 | Kain | |
| 5,740,883 A | 4/1998 | Trank | |
| 5,913,380 A | 6/1999 | Gugel et al. | |
| 5,967,260 A | 10/1999 | Spak | |
| 6,073,726 A | 6/2000 | McCrystal | |
| 6,116,379 A | 9/2000 | Huss | |
| 6,220,389 B1 * | 4/2001 | Krause | E06C 1/12 182/163 |
| 6,454,050 B2 | 9/2002 | Gibson et al. | |
| 6,587,022 B1 | 7/2003 | Devine | |
| 6,607,053 B1 * | 8/2003 | Warren | E06C 7/182 182/106 |
| 6,614,337 B1 | 9/2003 | Winnard | |
| 6,637,548 B2 | 10/2003 | Pass | |
| 6,698,550 B2 * | 3/2004 | Crain | E06C 1/22 182/166 |
| 6,698,699 B1 | 3/2004 | Bailey | |
| 6,874,598 B1 | 4/2005 | Baker | |
| 6,986,405 B2 | 1/2006 | Meeker | |
| 6,997,282 B1 | 2/2006 | Sharp et al. | |
| 7,000,732 B1 | 2/2006 | Briggs Jr. | |
| 7,032,711 B1 | 4/2006 | Katz | |
| 7,114,592 B1 | 10/2006 | Gibson et al. | |
| 7,128,187 B2 | 10/2006 | Simpson | |
| 7,310,035 B2 | 12/2007 | Wooten | |
| D576,290 S | 9/2008 | Meyers et al. | |
| 7,849,967 B2 | 12/2010 | Gibson et al. | |
| 7,931,123 B2 | 4/2011 | Moldthan et al. | |
| 8,042,653 B2 * | 10/2011 | Grebinoski | E04G 1/15 182/223 |
| 8,186,481 B2 | 5/2012 | Moss et al. | |
| 2002/0084143 A1 | 7/2002 | Roy | |
| 2004/0200669 A1 | 10/2004 | Saccente et al. | |
| 2004/0238278 A1 | 12/2004 | Gibson | |
| 2005/0121261 A1 | 6/2005 | Moss | |
| 2005/0186023 A1 * | 8/2005 | Lee | F16B 7/105 403/109.3 |
| 2006/0006024 A1 | 1/2006 | Till | |
| 2006/0124397 A1 * | 6/2006 | Vosbein-Jensen | E06C 1/20 182/165 |
| 2006/0169539 A1 * | 8/2006 | Grebinoski | E04G 1/15 182/223 |
| 2006/0249331 A1 | 11/2006 | Meeker | |
| 2007/0120028 A1 | 5/2007 | Kane | |
| 2007/0181368 A1 | 8/2007 | Simpson | |
| 2007/0181369 A1 | 8/2007 | Gibson | |
| 2009/0078503 A1 * | 3/2009 | Eriksson | E06C 1/125 182/18 |
| 2009/0283361 A1 | 11/2009 | Gibson et al. | |
| 2010/0282540 A1 | 11/2010 | Moss et al. | |
| 2011/0011678 A1 * | 1/2011 | Sheffield | E04G 1/24 182/141 |
| 2011/0127110 A1 | 6/2011 | Trang | |
| 2012/0211305 A1 * | 8/2012 | Moss | E06C 1/22 182/106 |
| 2015/0267468 A1 * | 9/2015 | Moss | E06C 1/12 182/209 |
| 2016/0023347 A1 * | 1/2016 | Ho | B25G 1/04 16/429 |
| 2017/0058930 A1 * | 3/2017 | Liu | F16B 7/105 |

FOREIGN PATENT DOCUMENTS

| | | |
|---|---|---|
| CN | 101050687 A | 10/2007 |
| DE | 4403001 A1 | 8/1994 |
| EP | 2169175 A1 | 3/2010 |
| GB | 2305956 A1 | 4/1997 |
| JP | 10-088949 | 4/1998 |
| JP | 2000054616 A | 2/2000 |
| KR | 20-0412244 | 3/2006 |
| NL | 7614042 A | 6/1977 |
| WO | 9902915 A1 | 1/1999 |

OTHER PUBLICATIONS

Search Report for corresponding Chinese Patent Application No. 201310495421.1, issued Jan. 22, 2015.
International Search Report dated Oct. 27, 2009 for International Application No. PCT/US2009/036402.
Extended European Search Report for corresponding European Patent Application No. 16155292.2, mailed Apr. 29, 2016.

* cited by examiner

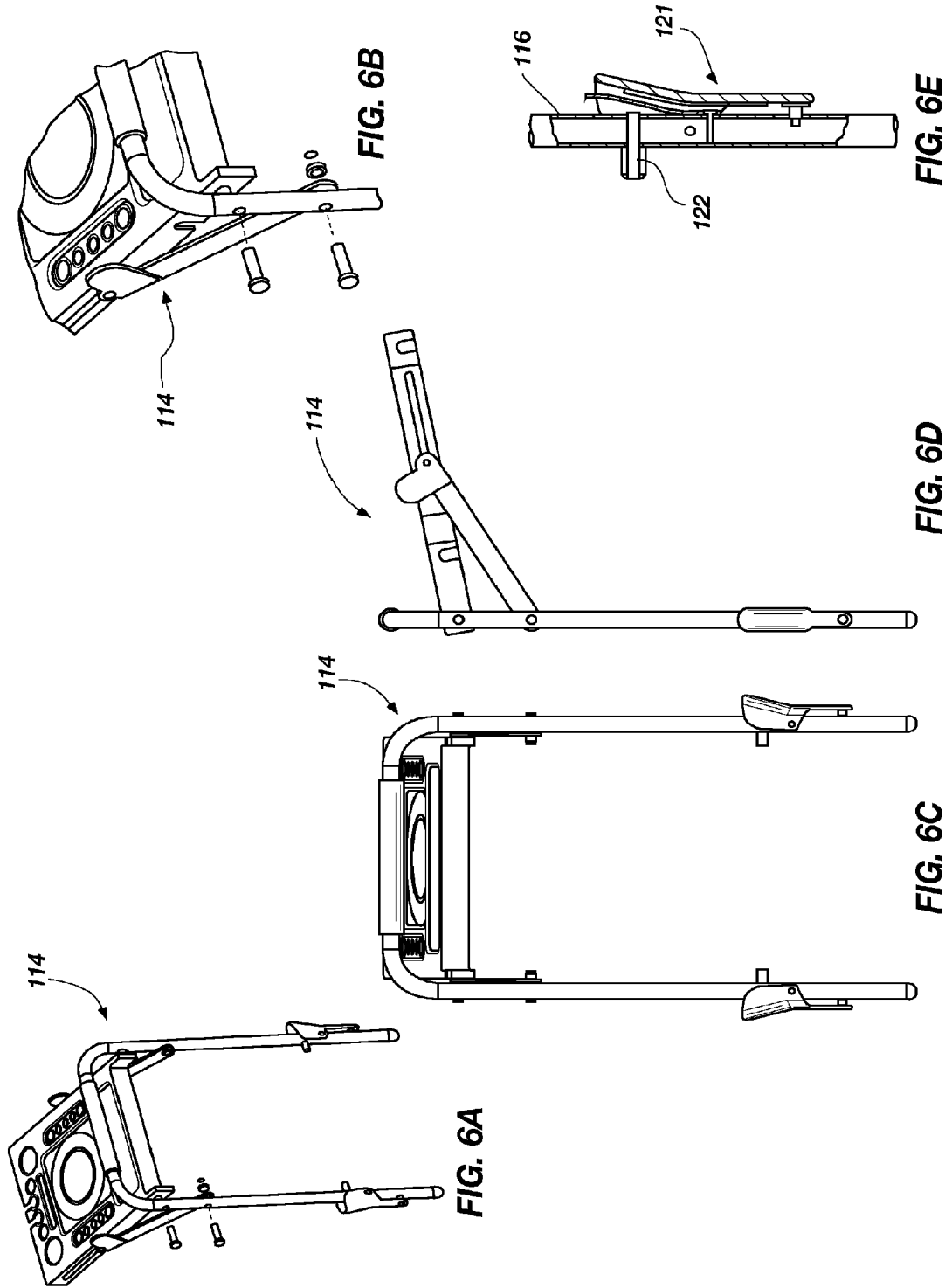

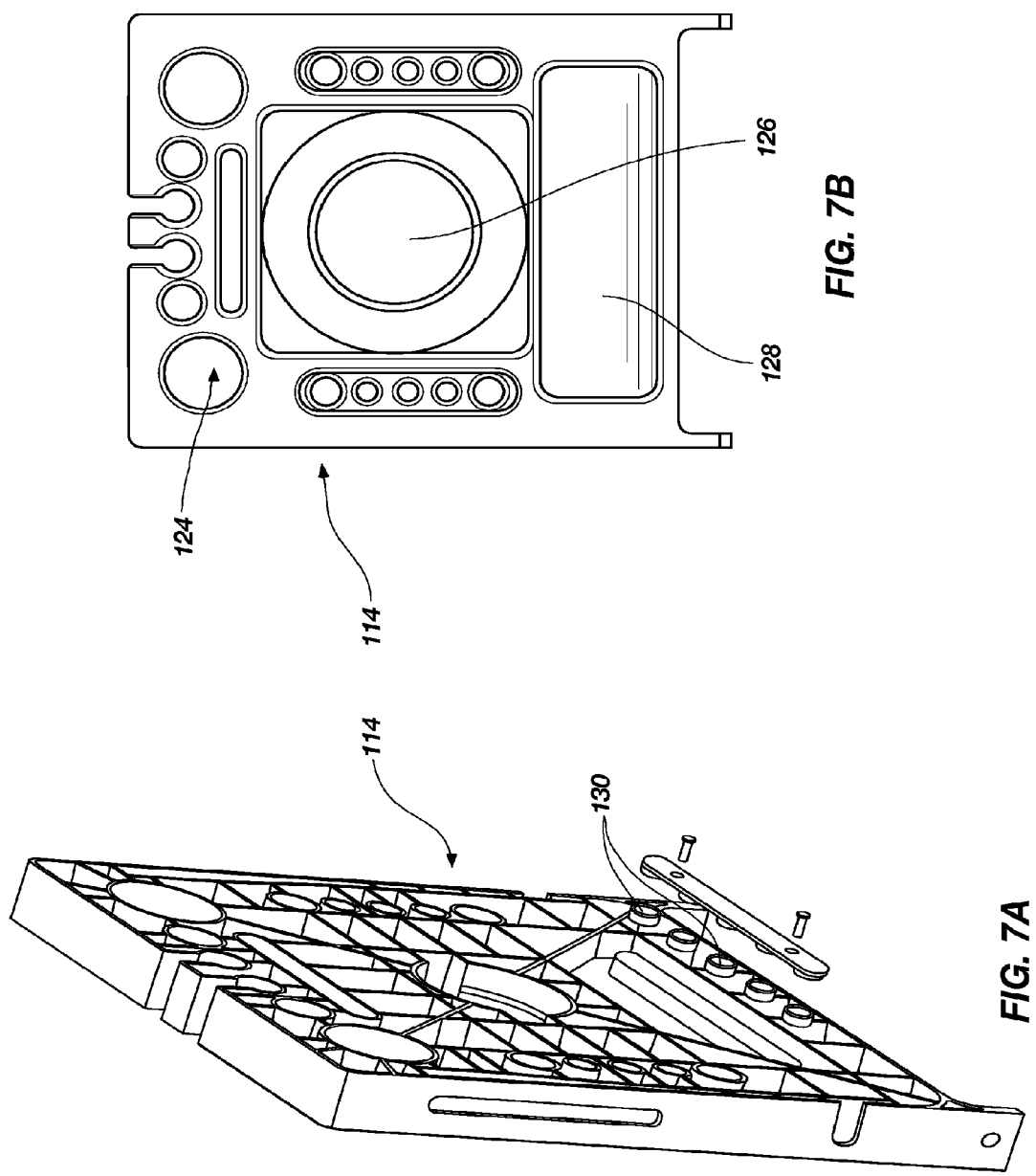

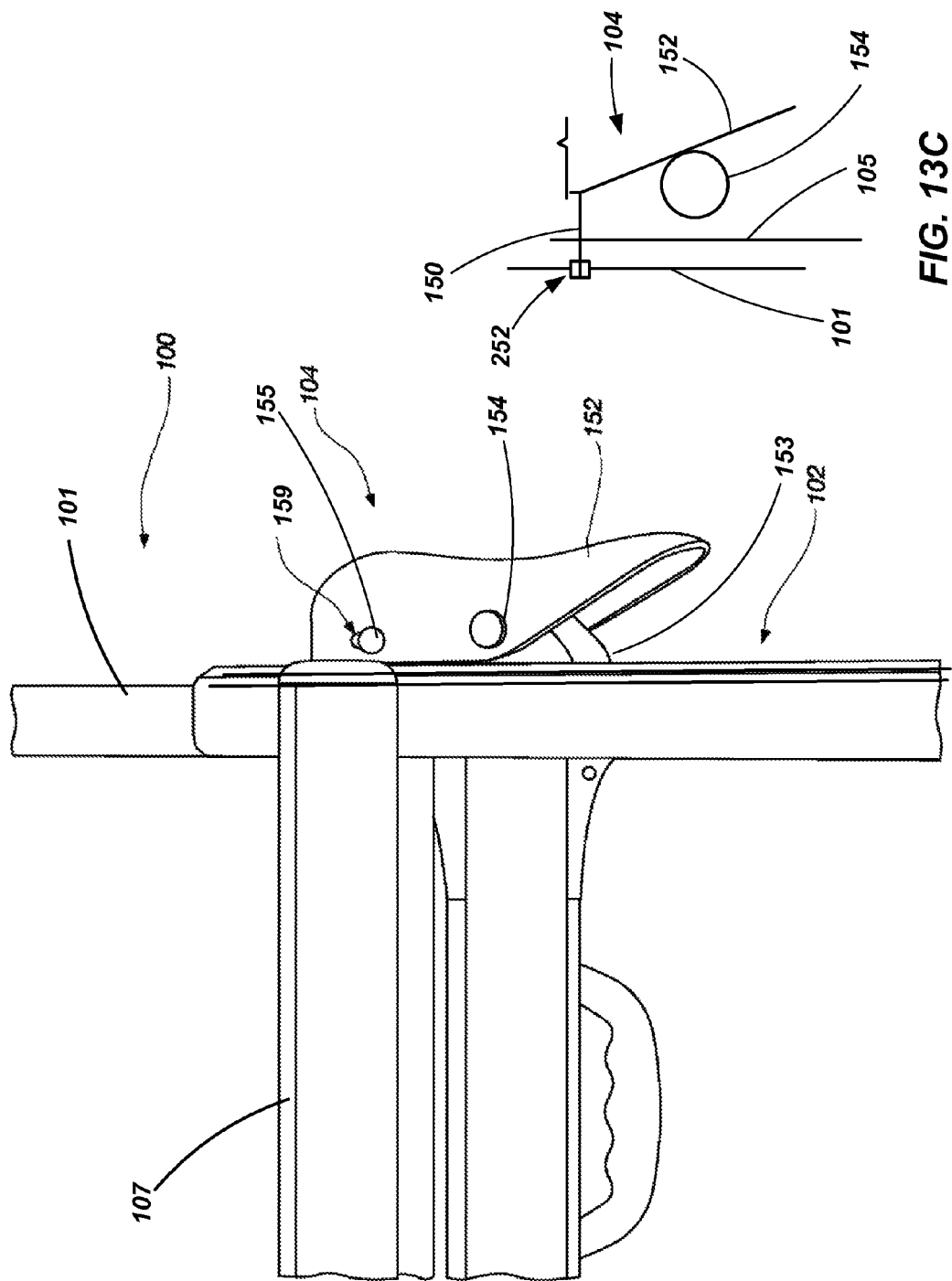

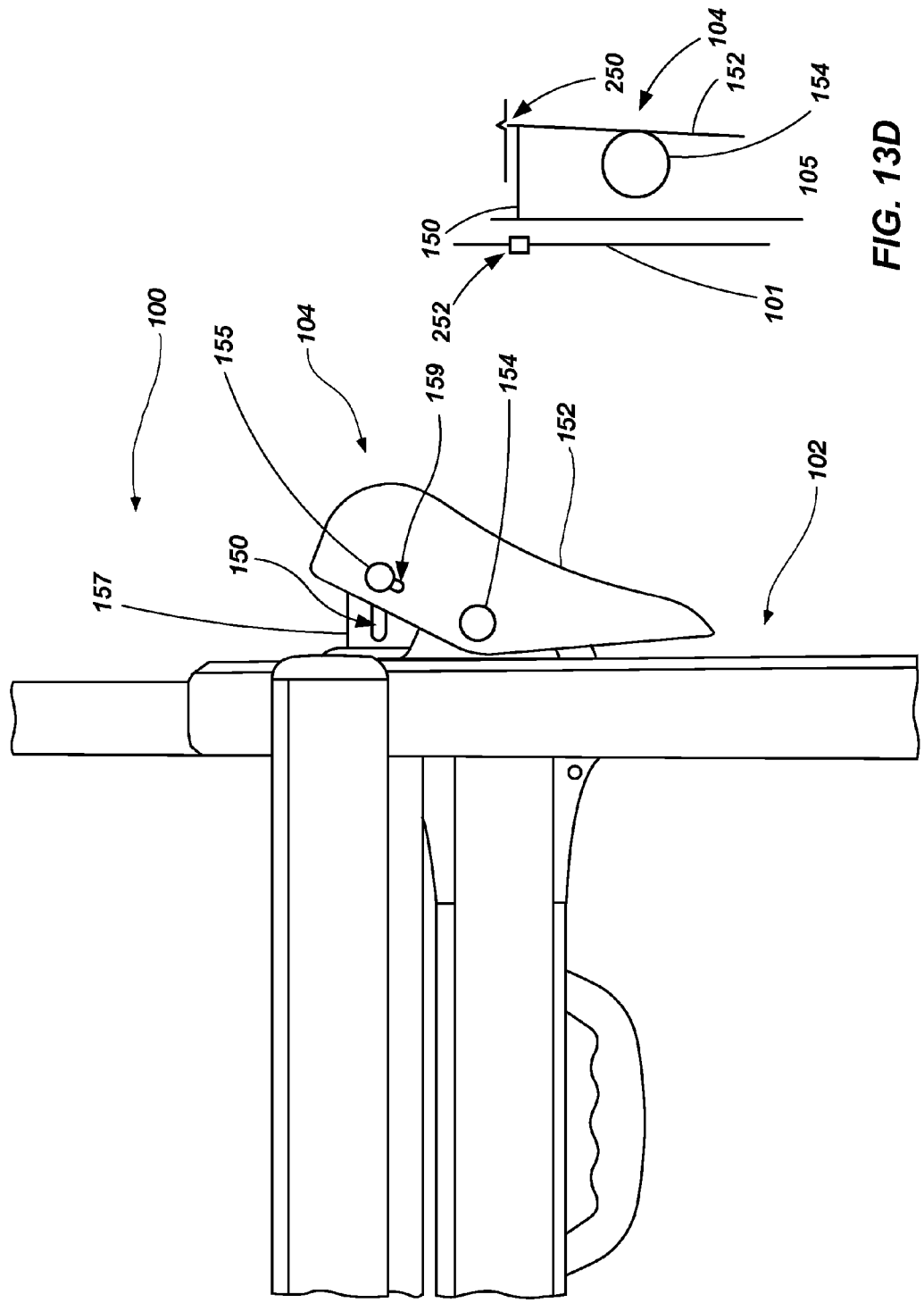

LADDERS, LADDER COMPONENTS AND RELATED METHODS

CROSS-REFERENCE TO RELATED APPLICATIONS

The present application is a continuation of U.S. patent application Ser. No. 13/480,897 entitled LADDERS, LADDER COMPONENTS AND RELATED METHODS, filed on May 25, 2012, which claims the benefit of U.S. patent application Ser. No. 12/399,815 entitled LADDERS, LADDER COMPONENTS AND RELATED METHODS, filed Mar. 6, 2009, now U.S. Pat. No. 8,186,481, which claims the benefit of U.S. Provisional Application No. 61/068,656 entitled LADDERS, LADDER COMPONENTS AND RELATED METHODS, filed Mar. 7, 2008, the disclosures of which are each incorporated by reference herein in their entireties.

TECHNICAL FIELD

The present invention relates generally to ladders, ladder systems, ladder components and related methods and, more specifically, to adjustable rail configurations, rail structures, locking mechanisms, trays and platform configurations, hinge configurations and related methods of manufacturing and operating the same.

BACKGROUND

Ladders are conventionally used to provide a user thereof with improved access to locations that might otherwise be inaccessible. Ladders come in many shapes and sizes, such as straight ladders, straight extension ladders, stepladders, and combination step and extension ladders. So-called combination ladders incorporate, in a single ladder, many of the benefits of other ladder designs.

Ladders are common tools for professional tradesman and homeowners alike. Sometimes the use of a ladder can be an awkward experience, even for those who use ladders on a regular basis, when certain tasks are to be performed while standing on a ladder. For example, it can be easy to lose one's balance on a ladder while working on an overhead project (e.g., painting a ceiling, changing a light bulb, etc.) Moreover, when one needs to utilize tools or access other resources (e.g., hardware, paint, etc.) while working on a ladder, temporary storage of such tools or other items is often problematic. Often, the user of a ladder may have to make many trips up and down the ladder to exchange tools or other equipment during the performance of a particular job making the use of the ladder less efficient than it could be.

Additionally, operation of some ladders is not always simple, efficient or safe. For example, in collapsing the spreaders of an A-frame type stepladder can result in the pinching of ones fingers or hands. Similarly, when ladders are adjustable in height or adjustable from one configuration to another, the associated actuation mechanism used to effect the adjustments may result in pinched hands or fingers or, in many cases, just difficulty in efficiently effecting the actuation at all.

For example, in some ladders, such as combination ladders, the height of the ladder may be adjusted by actuating locking members (sometimes referred to as "lock tabs") on the sides of the ladder. The action of actuating such locking members usually requires a lateral displacement of the locking members outward, or away from, the side rails of the ladders. Such an action can be awkward and difficult for some people to perform. In many cases, such as when smaller users are trying to adjust the height of the ladder, significant effort may be required.

Additionally, the structural stability of ladders is always an area for improvement. For example, in stepladders, a hinged or collapsing spreader conventionally extends between opposing rails on each lateral side of the ladder. Little else is used to maintain the opposing ladder rails in a desired relationship or to otherwise reduce or minimize "ladder walk" as will be recognized by most users of ladders.

Considering the desire within the industry to continually improve the safety, functionality and efficiency of ladders, the present includes a number of embodiments that provide enhanced ease of use, stability and safety in the use of ladders.

BRIEF SUMMARY OF THE INVENTION

Ladders, ladder components and related methods are provided in accordance with various embodiments of the present invention. In one embodiment, a ladder includes a first assembly having a pair of inner rails and a pair of outer rails. The pair of inner rails is slidably coupled with the pair of outer rails. At least one locking mechanism is coupled to an outer rail, the locking mechanism including a lever and an engagement pin coupled therewith. The lever is located and configured to pivot relative to the outer rail such that, upon application of a force to a portion of the lever in a first direction towards the outer rail, the engagement pin is retracted in a direction that is different from the first direction. In one embodiment, the engagement pin is pivotally coupled with the lever.

In another embodiment, a ladder is provided that includes a first rail assembly, including at least one pair of rails and a plurality of rungs coupled therewith, and a second rail assembly including at least one pair of rails. A top cap is coupled to the first rail assembly and the second rail assembly and a device is configured to be selectively coupled to the top cap in at least two different positions. The device includes a rail and a tray movably coupled to the rail. The ladder may further include at least one bracket coupled to the second rail assembly and configured for cooperatively coupling with the device to place the device in a stowed state.

In another embodiment a ladder includes a first rail assembly including at least one pair of rails and a plurality of rungs coupled therewith and a second rail assembly including at least one pair of rails. A spreader mechanism is disposed between, and coupled with, the first rail assembly and the second rail assembly. The spreader mechanism includes cross bracing configured to be selectively positioned between a deployed state and a hingedly collapsed state. At least one handle is coupled with the cross bracing. In one embodiment, the at least one handle is oriented and configured to extend in a direction that is substantially orthogonal to a direction in which the plurality of rungs each extend.

In accordance with yet another embodiment, a ladder includes a first rail assembly including at least one pair of rails and a plurality of rungs coupled therewith and a second rail assembly including a first pair of rails and a second pair of rails slidably coupled with the first pair of rails. A locking mechanism is configured to selectively engage the first pair of rails and the second pair of rails of the second rail assembly to lock the first pair of rails relative to the second pair of rails. The locking mechanism includes a pivoting structure disposed between the first pair of rails of the second rail assembly, a handle coupled with the pivoting structure and a pair of pins selectively displaceable and configured to engage aligned openings in respective inner and outer rails of the second rail assembly. The locking mechanism may further be associated with a cross-brace, wherein the handle is selectively positionable between a first position and a second position, the handle having a shoulder portion that abuts an undersurface of the cross-brace when in the first position. Additionally, at least one pin ma be associated with the handle, wherein the at least one pin is sized, located and configured to engage an opening in the undersurface of the cross-brace when the handle is in the first position.

In accordance with another embodiment of the present invention, a hinge assembly is provided. The hinge assembly includes a first hinge component and a second hinge component pivotally coupled with one another. A mechanism is configured to selectively lock and disengage the first hinge component relative to the second hinge component. A magnet is associated with the mechanism, wherein the magnet is located and configured to exert a sufficient magnetic force on a specified object such that the object is held against the mechanism without aid of additional structure.

In accordance with another embodiment of the present invention, a method of adjusting a ladder is provided, wherein the ladder has an assembly with inner rails slidably coupled with outer rails. The method includes locking an inner rail relative to an associate outer rail by engaging aligned apertures in the inner and outer rails with an engagement pin, coupling a lever to the engagement pin, and applying a force to the lever in a direction of the outer rail and displacing the engagement pin in substantially opposite direction.

In accordance with a further embodiment of the present invention, a method of temporarily storing an object on a ladder is provided. The method includes magnetically coupling the object with a portion of the ladder such that the object is maintained in a substantially constant position relative to the ladder without the aid of additional structure being the force of the magnetic coupling.

BRIEF DESCRIPTION OF THE SEVERAL VIEWS OF THE DRAWINGS

The foregoing and other advantages of the invention will become apparent upon reading the following detailed description and upon reference to the drawings in which:

FIGS. 6A-6E are various views of a component of the ladder shown in FIG. 1 in accordance with embodiments of the present invention;

FIGS. 7A and 7B are perspective and front views, respectively, of a subcomponent of the component shown in FIGS. 6A-6E;

FIGS. 13A and 13B show a front view of the ladder shown in FIG. 1 including the component or mechanism shown in FIG. 12 in first and a second states or positions, respectively, and FIGS. 13C and 13D schematically show the component or mechanism in its first and second states, corresponding with the states shown in FIGS. 13A and 13B;

DETAILED DESCRIPTION OF THE INVENTION

Figure 1:
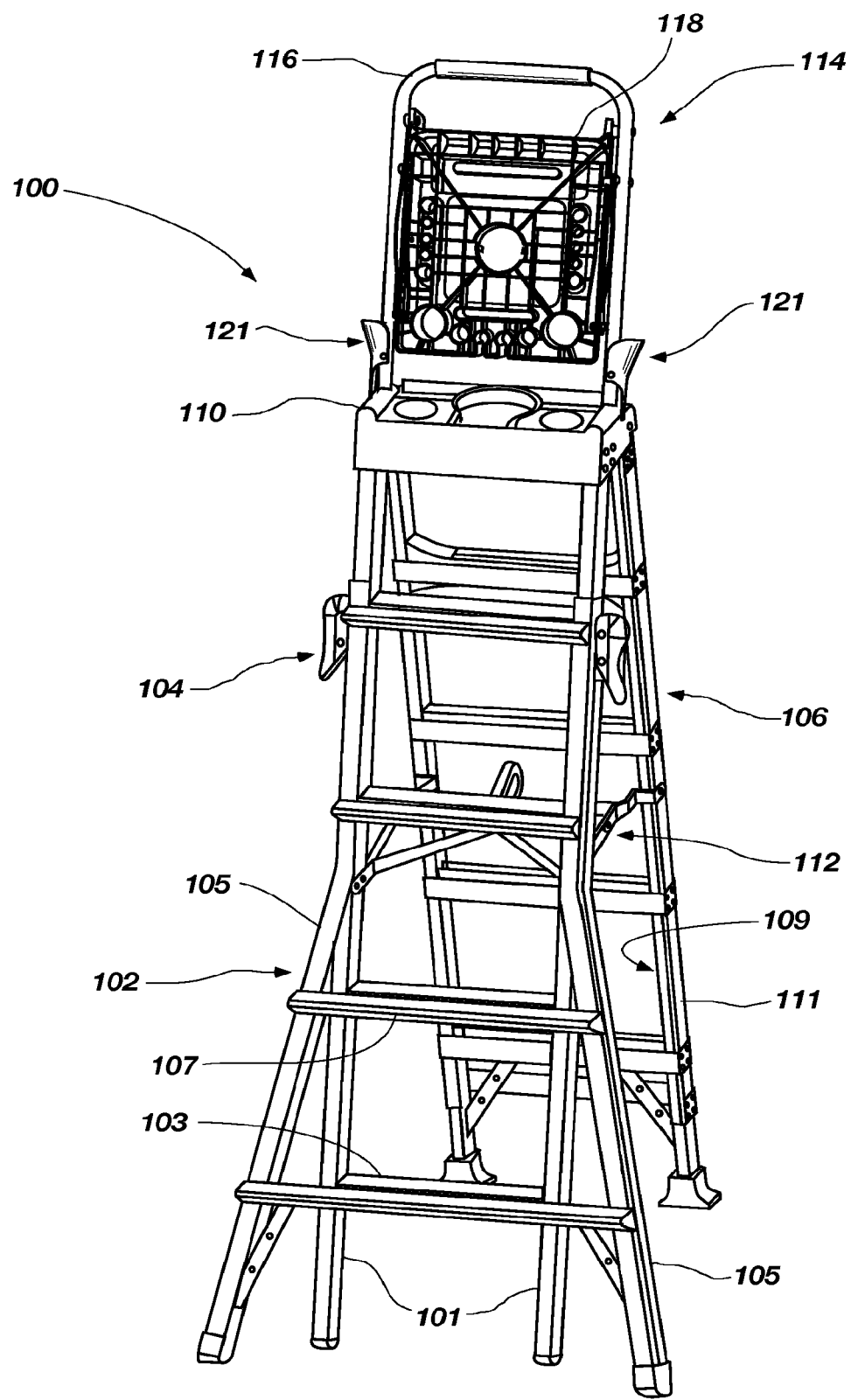
FIG. 1 is a perspective view of a ladder in accordance with an embodiment of the present invention.

Referring to FIGS. 1 through 4, a ladder 100 is shown in accordance with an embodiment of the present invention. The ladder 100 is shown as a stepladder and includes a first assembly 102 including inner rails 101 having a plurality of rungs 103 extending between, and coupled to, the inner rails 101. The first assembly 102 further includes outer rails 105 connected by a plurality of rungs 107. The inner and outer rails 101 and 105 are slidably connected to each other such that they may be extended or retracted to exhibit different heights. One such assembly is described in U.S. Pat. No. 4,210,224 to Kummerlin, the disclosure of which is incorporated by reference herein in its entirety. The first assembly 102 further includes a locking mechanism 104 coupled with the outer rails 105 and configured to engage or release the inner rails 101 from the outer rails 105 so that they may be selectively displaced relative to one another and effect different ladder heights. The locking mechanism 104 will be discussed in further detail hereinbelow.

The ladder 100 further includes a second assembly 106 which may also include inner rails 109 and outer rails 111 slidingly coupled to one another. In the embodiment shown, the second assembly 106 includes cross bracing to stiffen the second assembly 106 and provide desired structural rigidity. However, in the embodiment shown in FIGS. 1 through 4, the second assembly 106 does not include rungs for a user to climb on. Such a configuration is conventional for many stepladder configurations. However, it is noted that in other embodiments, the second assembly 106 may include rungs and may be configured, for example, similar to the first assembly 102.

Another locking mechanism 108 may be used to selectively lock and release the inner rails 109 relative to the outer rails 111 of the second assembly 106. The locking mechanism 108 will be described in further detail below.

The first and second assemblies 102 and 106 may each be coupled to a top cap 110. One of the first and second assemblies 102 and 106 (or both) may be configured to pivot relative to the top cap 110 such that the assemblies 102 and 106 may be displaced toward each other for compact storage and as will be appreciated by those of ordinary skill in the art. The top cap 110 may include a number of features to enhance the efficiency and usability of the ladder 100 as will be described in further detail hereinbelow.

The ladder 100 further includes a spreader mechanism 112 coupled between the first and second assemblies 102 and 106 which extends therebetween to provide desired structural stability to the ladder 100 when in use, while also being configured to fold, such as by pivots or hinges, enabling the first and second assemblies 102 and 106 to collapse toward one another (with at least one of the assemblies 102 and 106 pivoting relative to the top cap 110) to place the ladder 100 in a stored state. Further details of the spreader mechanism 112 will be described hereinbelow.

Figure 2:
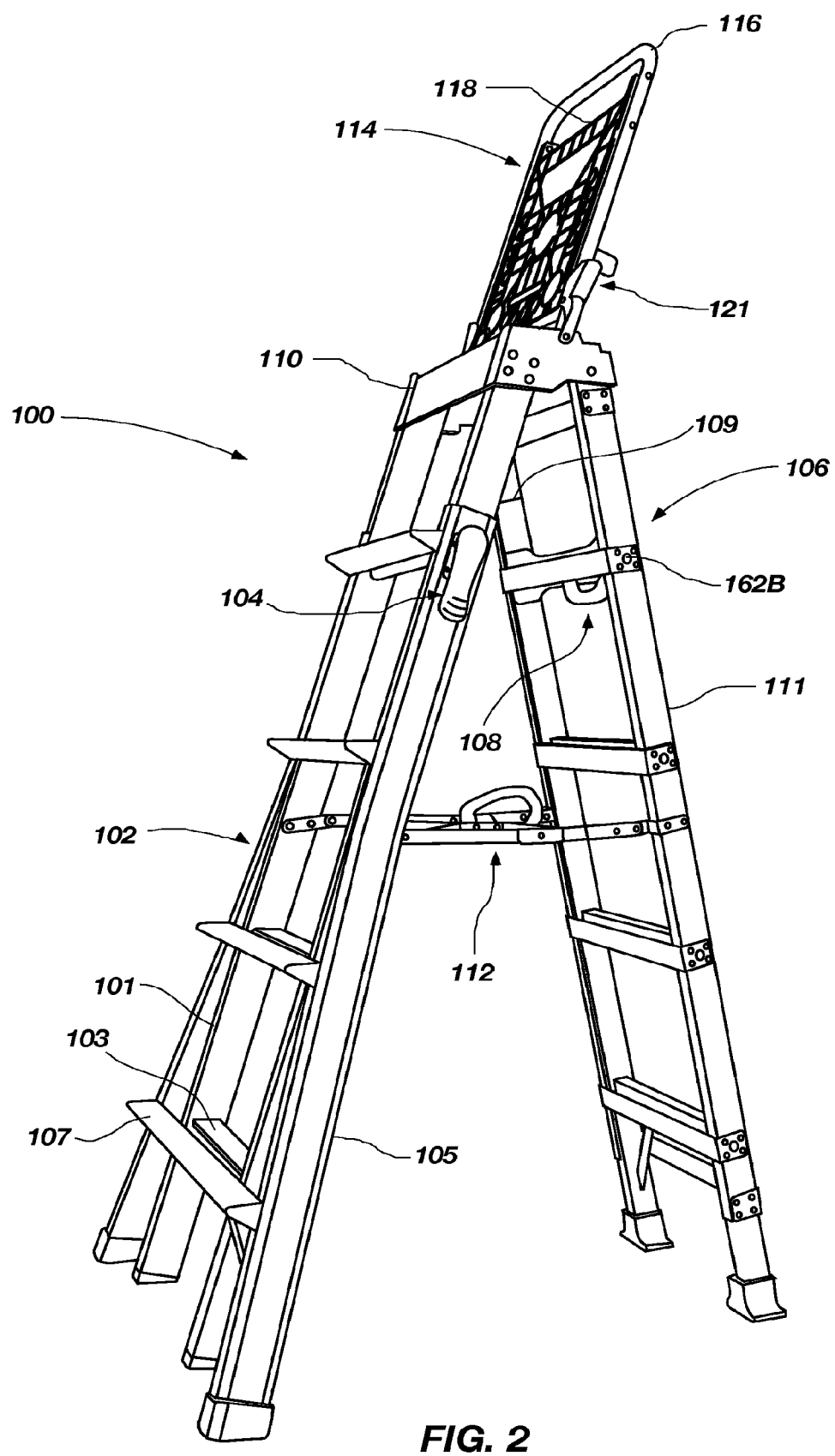
FIG. 2 is side perspective view of the ladder shown in FIG. 1 with a component shown in a first position or state.
Figure 3:
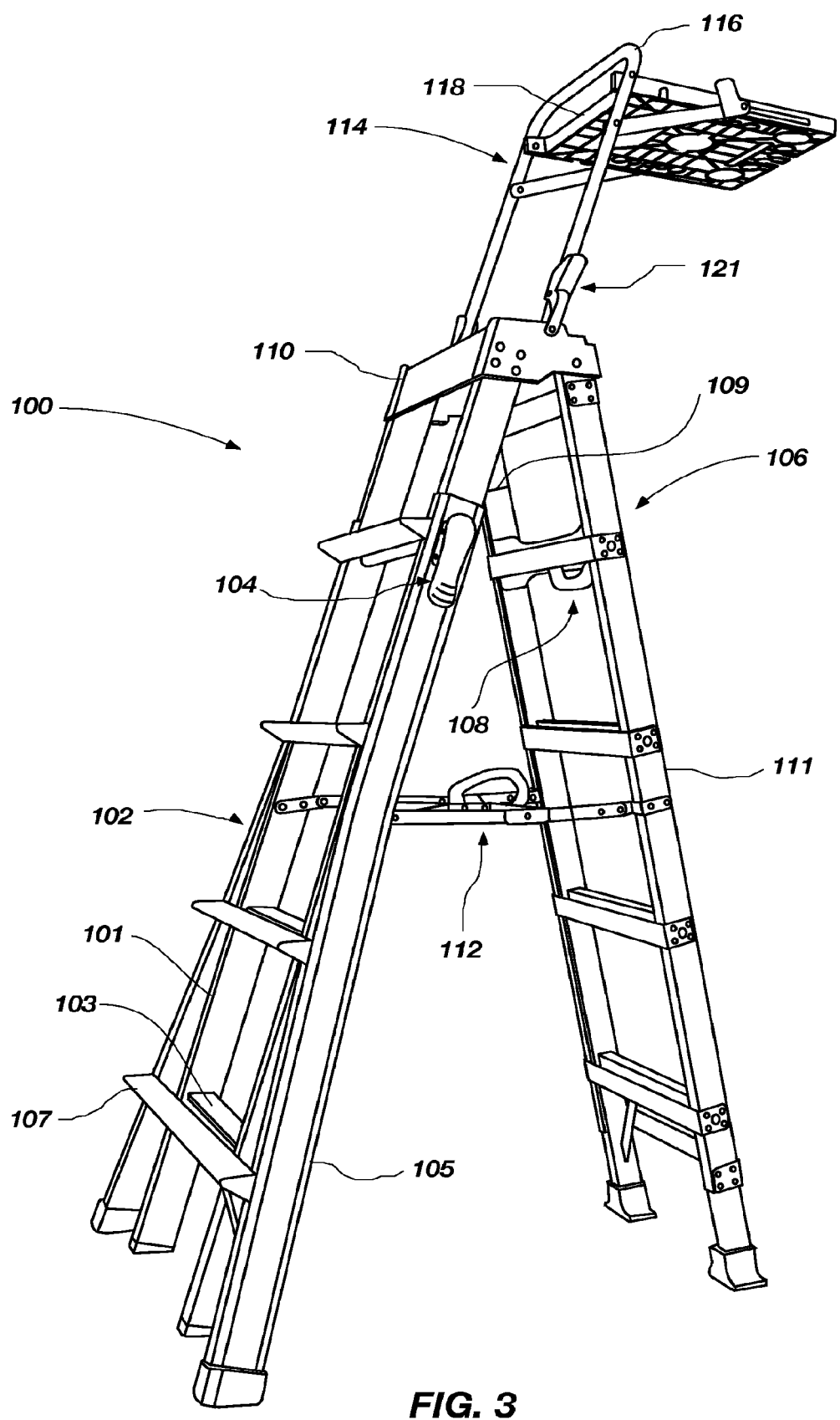
FIG. 3 is a side perspective view of the ladder shown in FIG. 1 with a component shown in a second position or state.

The ladder 100 additionally includes a component 114 or mechanism that is releasably attached thereto and which provides multiple functions. For example, as shown in FIGS. 2 and 3, the component 114 may be selectively installed or coupled with the ladder 100 (e.g., coupled with the top cap 110 of the ladder) such that a rail 116 may extend upward from the top cap 110, at an angle that is generally acute relative to a horizontal line (with the ladder in an orientation of intended use), and provide support to a user, wherein a user may grasp or lean on the rail 116 to brace themselves or help support them when working at elevated heights on the ladder 100. In the embodiment shown in FIGS. 2 and 3, the rail 116 is shown as extending in a plane that is substantially parallel with a plane defined by the outer rails 103 of the first assembly 102, although it may be configured to extend at other angles if desired. Additionally, the component 114 may include a tray 118 or platform that may be selectively positioned, such as shown in FIG. 3, to hold tools, hardware, paint or other items in a convenient and organized manner as shall be discussed in further detail herein.

Figure 4:
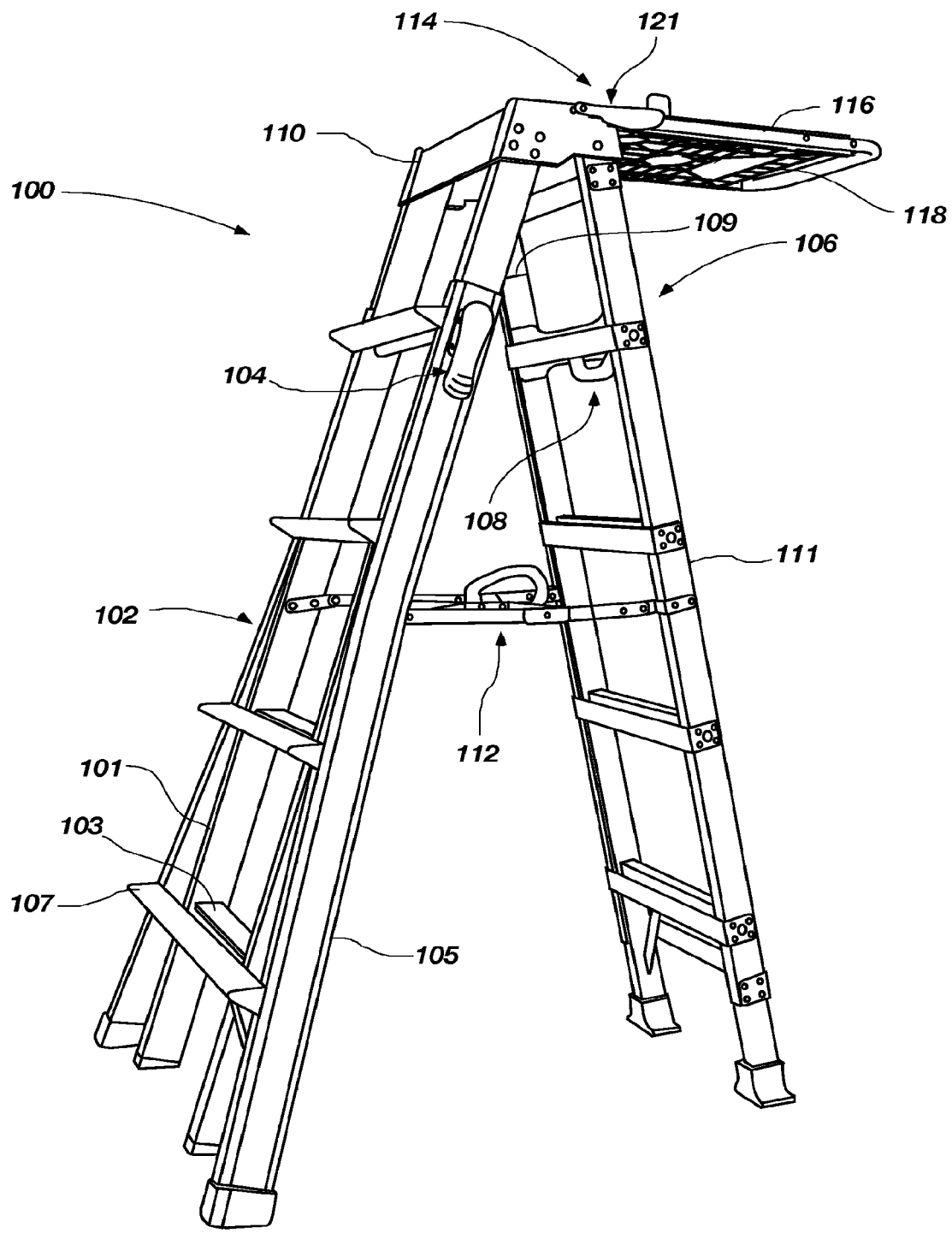
FIG. 4 is a side perspective view of the ladder shown in FIG. 1 with a component shown in a third position or state.

The component 114 may be selectively coupled with the ladder 100 in other positions. For example, as shown in FIG. 4, the component may extend substantially horizontally or laterally from the top cap 110 (with the ladder in an orientation of intended use) so that the tray 118 may be selectively positioned to hold various items, but at a different elevation as compared to the configuration that is shown in FIG. 3.

Figure 5:
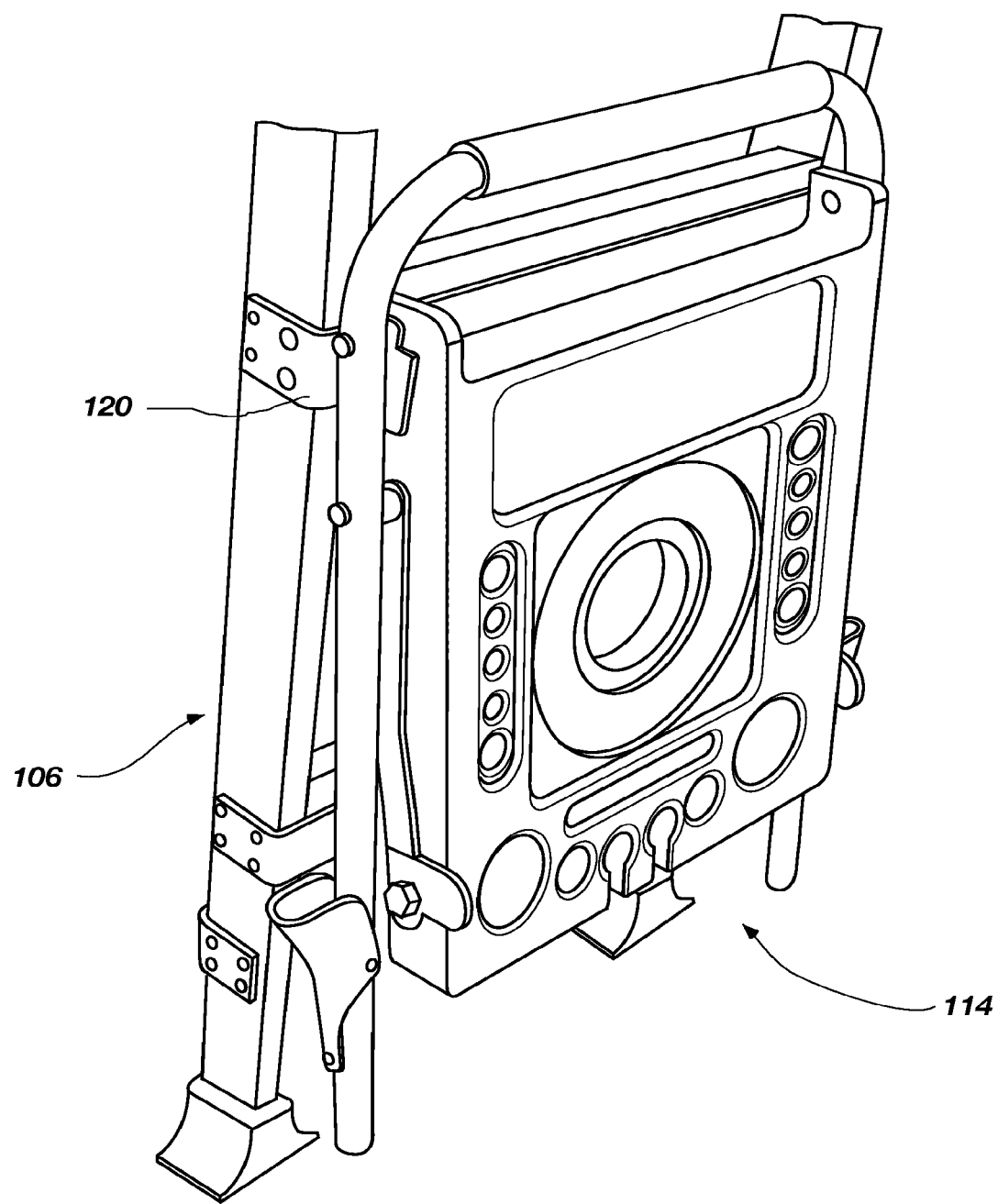
FIG. 5 is an enlarged view of a portion of the ladder shown in FIG. 1 with a component in a stored state.

As seen in FIG. 5, the component 114 may be removed from the upper portion of the ladder and then stored, such as with one or more brackets 120 coupled to, for example, inner or outer rails of the second assembly 106. Thus, the component 114 may be selectively deployed in a number of usable configurations or in a stowed configuration depending on the specific needs of the user at a given time.

FIGS. 6A-6D show various views of the component 114 in a deployed configuration, such as the configuration shown in FIG. 3 with the rail 116 extending upward from the ladder and the tray 118 being positioned relative to rail 116 to extend laterally, or substantially horizontally, therefrom. In other embodiments, the tray may be positioned to extend substantially parallel to, or lie within, a plane defined by the rail 116.

As seen more clearly in FIG. 6E, the component 114 may include one or more locking mechanisms 121 configured to selectively lock the component 114 in place relative to a portion of the ladder 100. The locking mechanism 121 may include, for example, an engaging pin 122 or other structure that is selectively displaceable by a user of the ladder and configured to engage mating openings or apertures in various portions of the ladder 100 (e.g., the top cap).

Figure 8A:
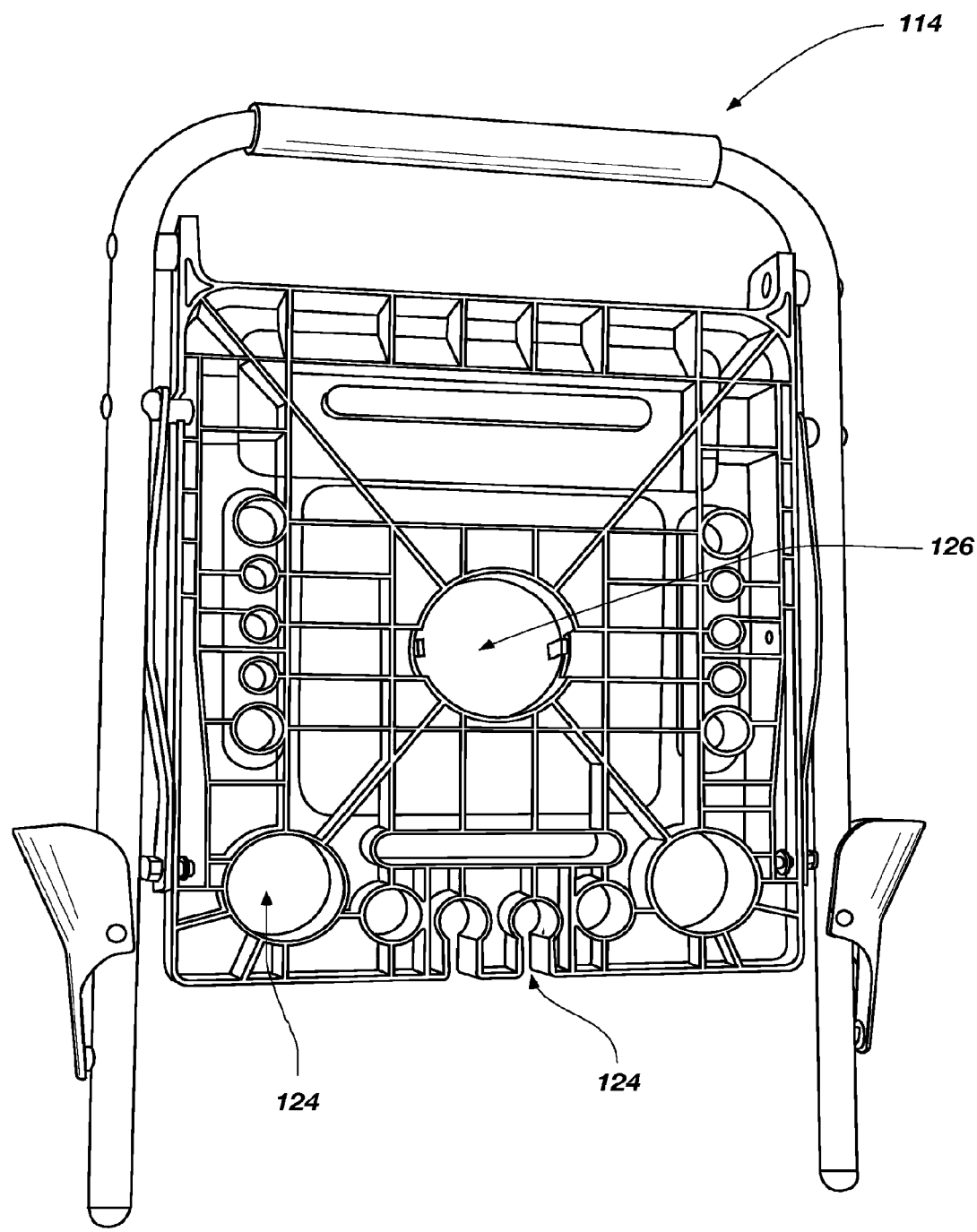
FIGS. 8A and 8B are front and rear views, respectively, of the component shown in FIGS. 6A-6E.
Figure 8B:
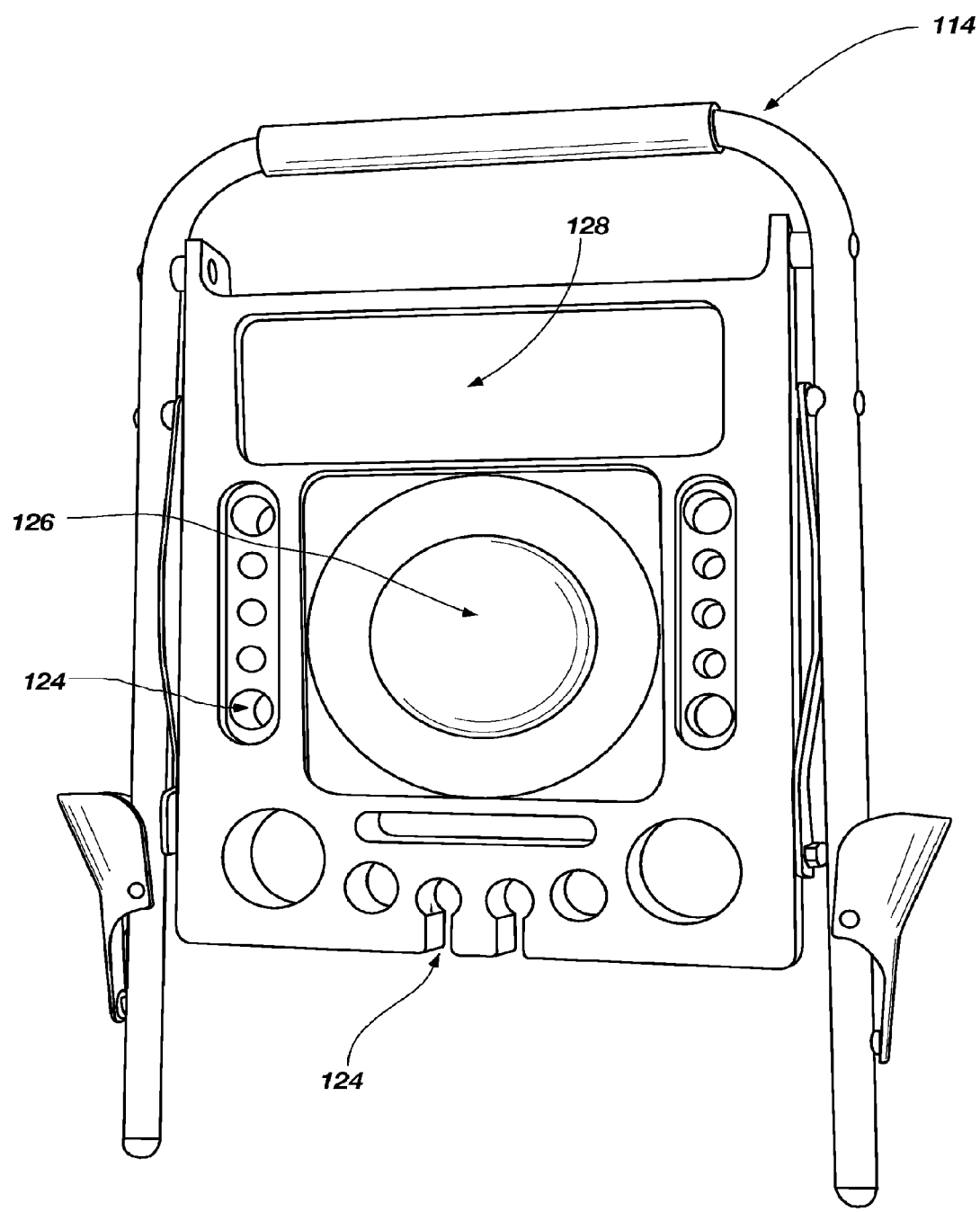

FIGS. 7A and 7B are rear perspective and front views of the tray 118 in accordance with an embodiment of the present invention. Additionally, FIGS. 8A and 8B show front and rear views of the component 114 with the tray 118 being positioned to lie substantially in plane with the rail 116. The tray 118 may include a plurality of openings 124 for holding various tools or other equipment. For example, some of such openings 124 may be sized to pass a portion of a screwdriver therethrough while holding a portion of the screwdriver above the tray 118 providing ready access to the tool for a user. The openings 124 may be variously sized to accept and support different types of tools (e.g., hammers, pliers, etc.). A relatively large opening may be formed in a portion of the tray 118 to accommodate temporary storage or holding of, for example, a power tool such as a drill. In the embodiment shown, a cap 126 is placed over the larger opening, and a recess is formed thereabout, to accommodate, for example, the holding of a paint can. Other recesses 128 may be formed in the tray 118 to temporarily hold or store other loose items (e.g., screws, nails, various tools, etc.). Magnets 130 may be disposed beneath or adjacent such recesses to provide further securement of such loose items. The tray 118 may further include slotted apertures, for example adjacent the peripheral edges of the tray 118, to hold various items such as the end of an extension cord or the end of a lanyard coupled to a tool or other item.

Figure 9A:
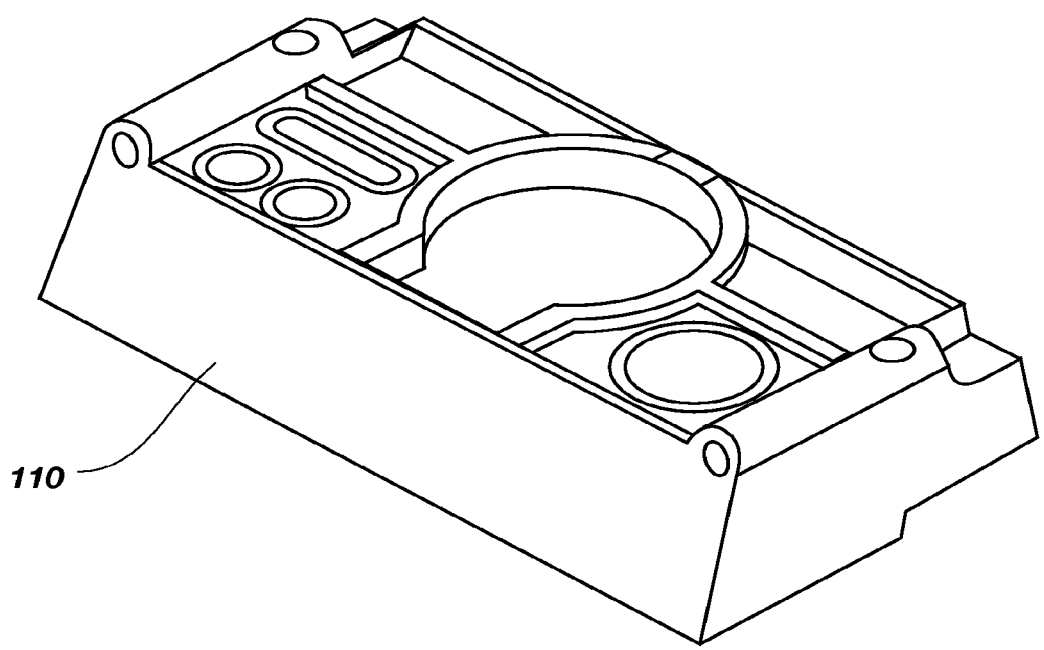
FIGS. 9A and 9B are perspective and top views, respectively, of a top cap assembly that may be used with a ladder in accordance with an embodiment of the present invention.
Figure 9B:
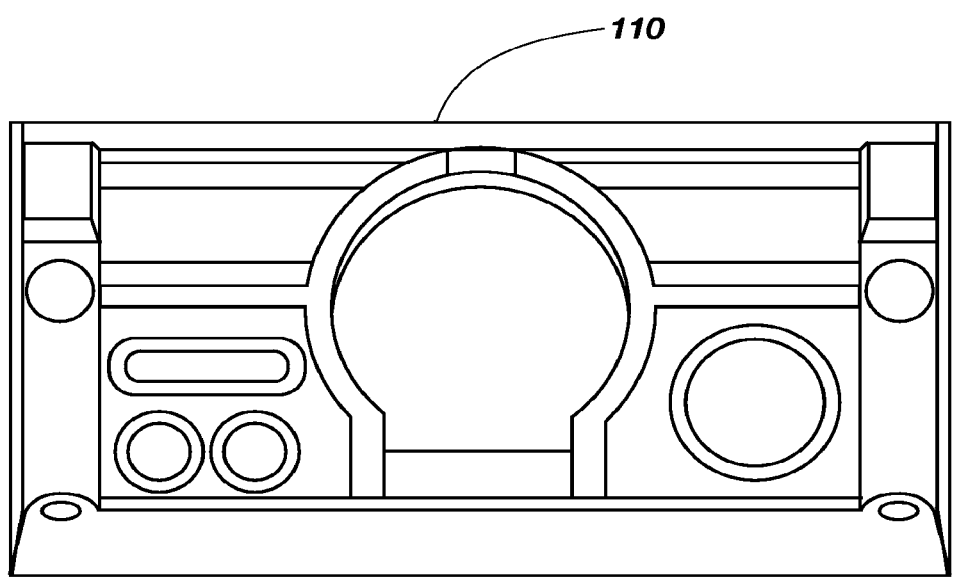

Referring to FIGS. 9A and 9B, a top cap 110 may be configured to include various features similar to that of the tray 118. For example, various openings, recesses, slotted apertures, or combinations thereof, may be formed in the top cap 110. Thus, the top cap 110 and the tray 118 may provide a substantial amount of temporary storage for tools, hardware and other equipment such that the user need not make numerous trips up and down the ladder to exchange tools or other equipment while performing a given task.

Figure 10:
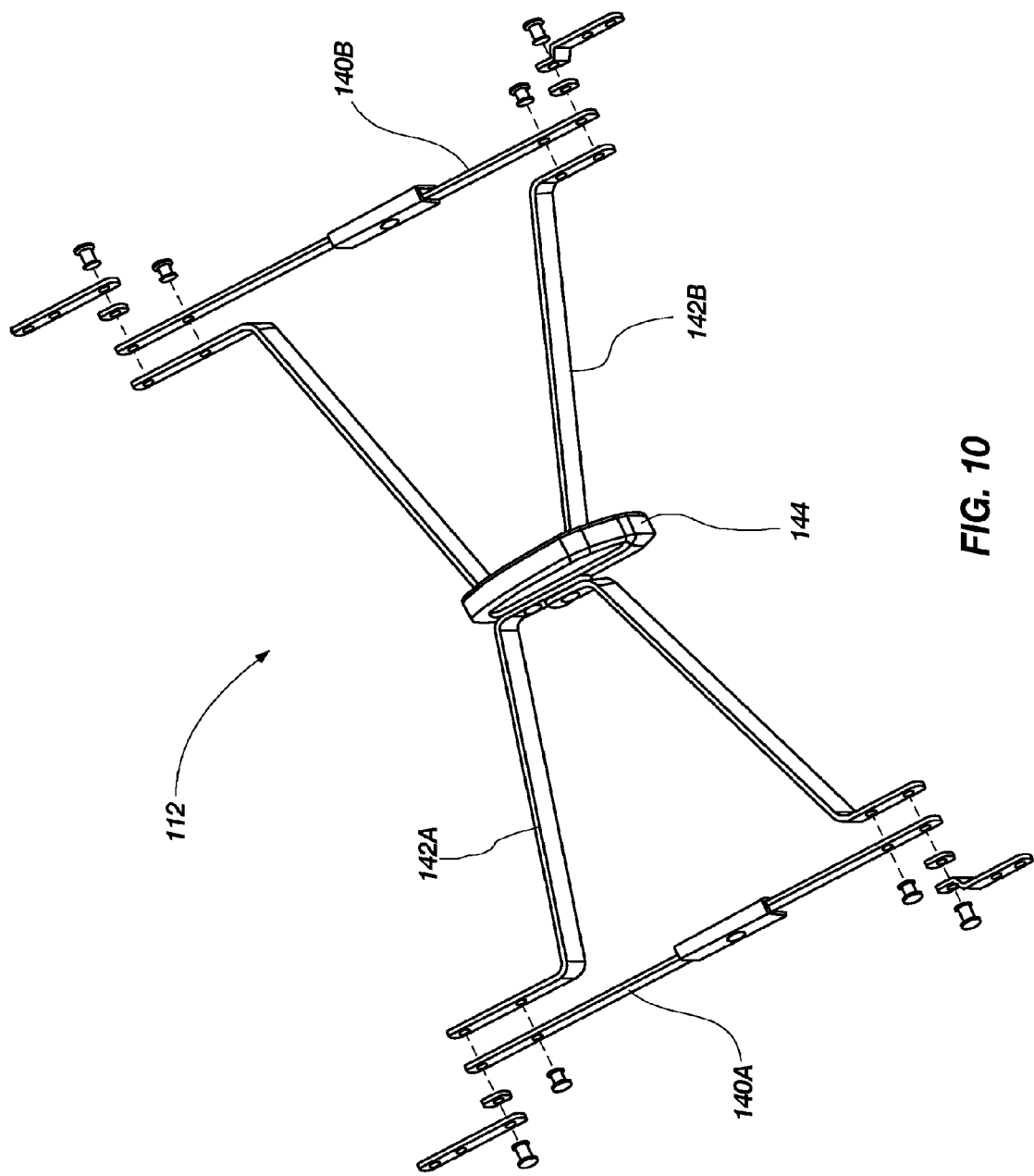
FIG. 10 is a perspective, exploded view of a mechanism of the ladder shown in FIG. 1 in accordance with an embodiment of the present invention.
Figure 11:
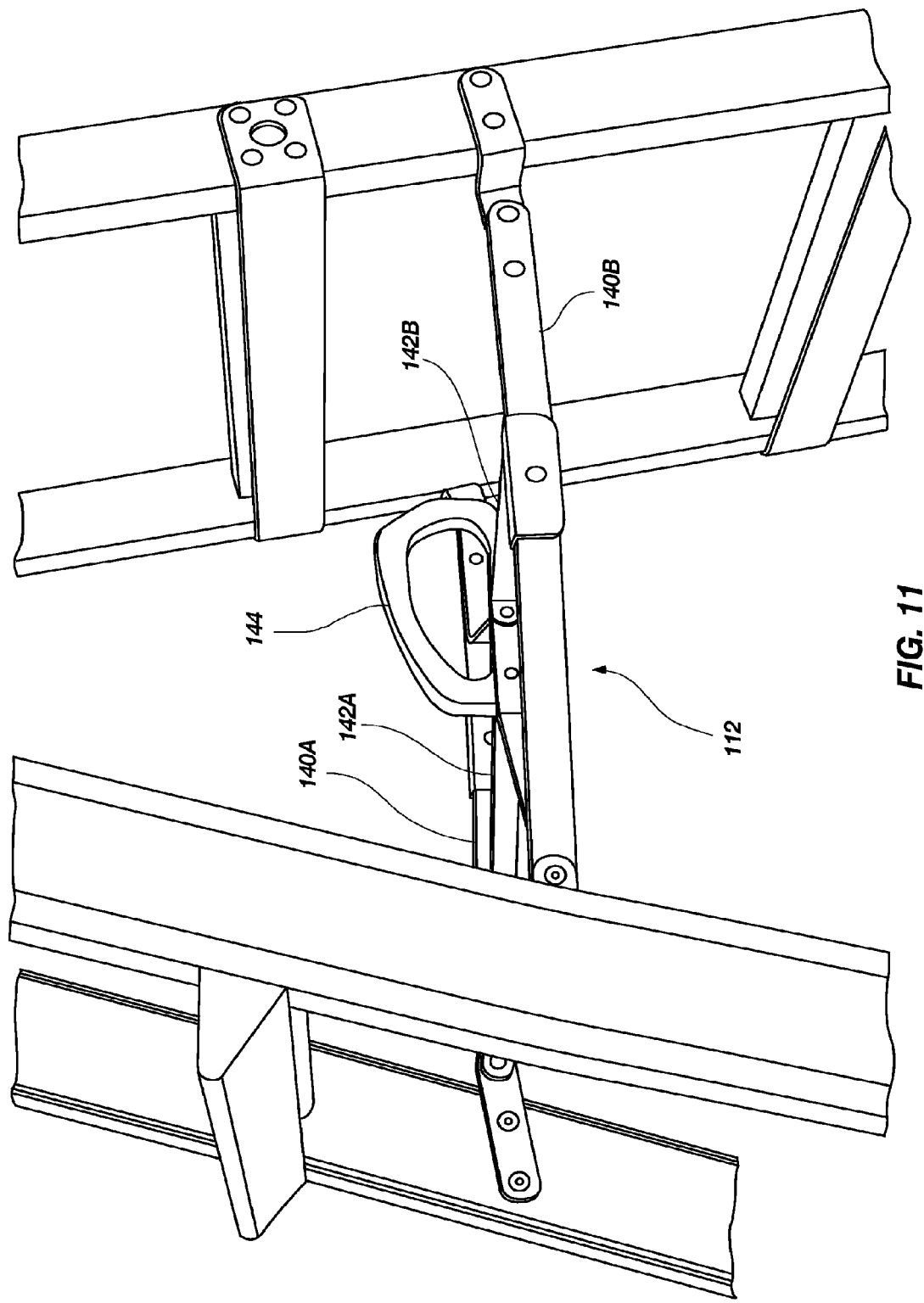
FIG. 11 is an enlarged, side perspective view of the ladder shown in FIG. 1, showing portions of the mechanism shown in FIG. 10 in accordance with an embodiment of the present invention.

Referring to FIGS. 10 and 11, a spreader mechanism 112 is shown in accordance with an embodiment of the present invention. The spreader mechanism 112 includes two outer structures 140A and 140B that are configured to hingedly transition between a collapsed or folded state (not shown) and an extended or deployed state (such as shown in FIGS. 10 and 11) as will be appreciated by those of ordinary skill in the art. The spreader mechanism 112 further includes two inner structures 142A and 142B that are similarly configured to transition between a collapsed or folder state and an extended or deployed state. The inner structures 142A and 142B are coupled to one another and are coupled to corresponding outer structures 140A and 140B such that all of the structures extend and collapse as a unit. In other words, the inner structures 142A and 142B fold in a manner similar to the outer structures 140A and 140B. Inner structures 142A and 142B of the spreader mechanism 112, when in an extended or deployed state, act as cross-braces for the spreader mechanism 112 providing added support and stability to the ladder 100 as compared to conventional spreaders used in a stepladder.

A handle 144 is coupled to the inner structures 142A and 142B of the spreader mechanism 112 without curtailing the folding nature of the inner structures 142A and 142B. In the embodiment shown, the handle 144 is oriented to extend in a direction substantially orthogonally to the direction in which the rungs of the ladder 100 extend (see also FIGS. 1-4). Such a configuration enables a user of the ladder 100 to collapse the spreader mechanism 112 by, for example, reaching between the rails of the first assembly 102, and between rungs of the first assembly 102, and pulling on the handle 144 in a direction that is generally upwards and towards the user when the ladder 100 is in an intended in-use orientation. Such a configuration enables collapsing of the ladder 100 by a user without the need to reach around, or walk around, the side of the ladder 100 to displace the spreaders. Additionally, the use of the handle 144 helps to prevent the possibility of a user pinching their hands or fingers in the hinge of a spreader or spreader mechanism.

Figure 12:
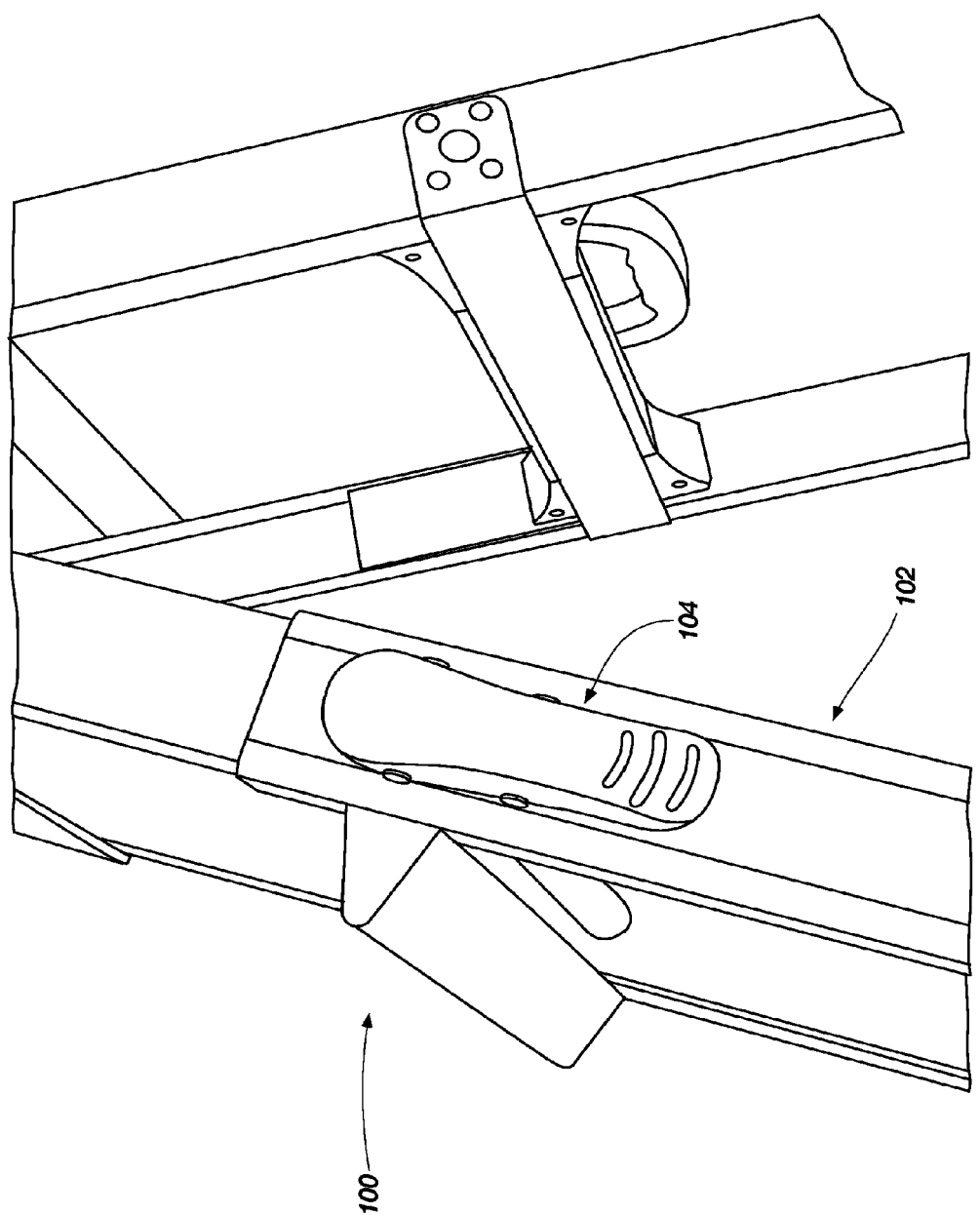
FIG. 12 shows a side view of the ladder shown in FIG. 1 including an enlarged view of a component or mechanism in accordance with an embodiment of the present invention.
Figure 14:
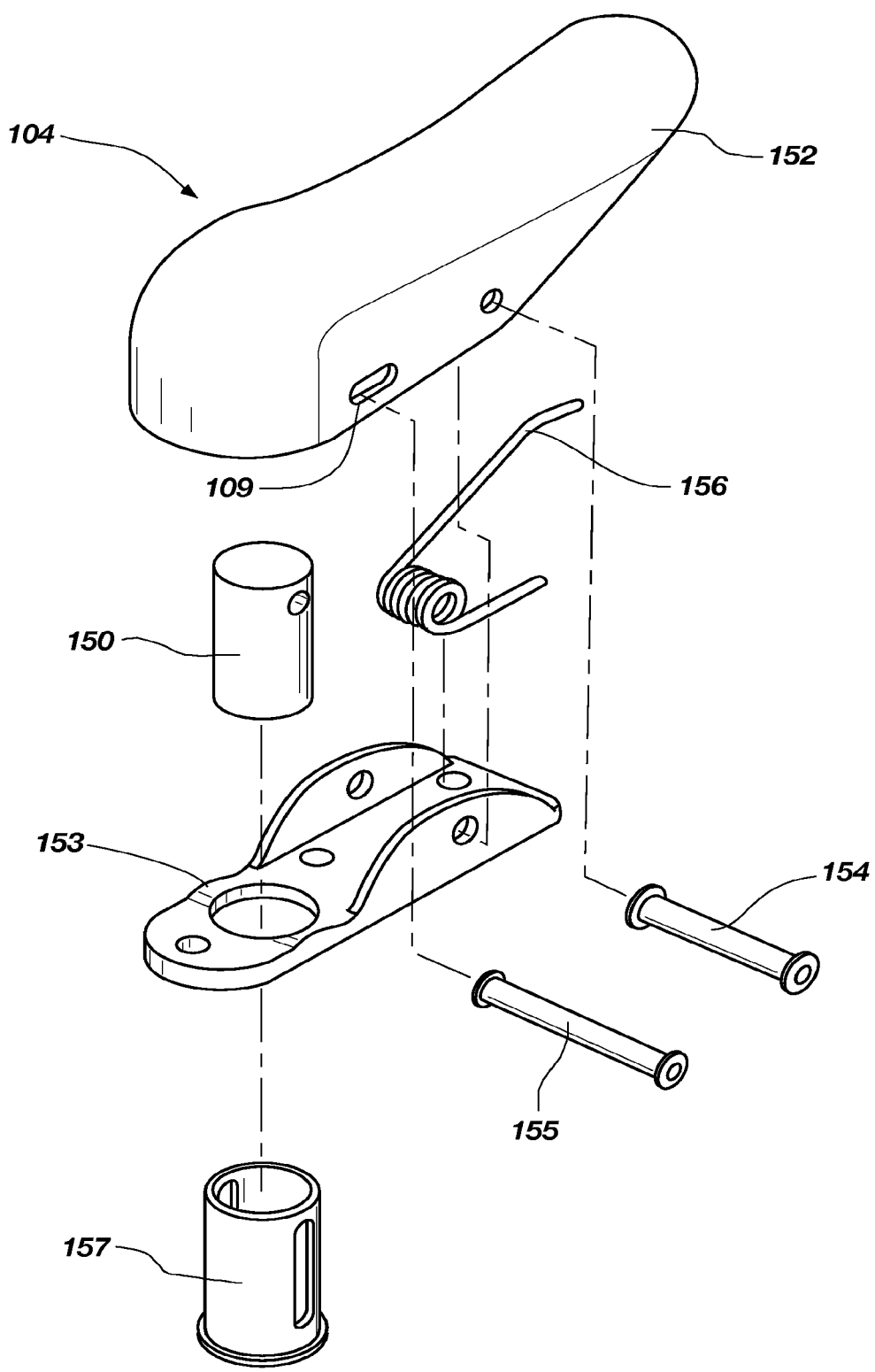
FIG. 14 is an exploded assembly view of the component or mechanism shown in FIGS. 12, 13A and 13B in accordance with an embodiment of the present invention.

Referring now to FIGS. 12, 13A, 13B and 14, a locking mechanism 104 is shown. FIG. 12 shows a side view of a ladder 100 including the locking mechanism 104. FIGS. 13A and 13B show front views of a ladder 100 including the locking mechanism 104 in a first position or state (FIG. 13A) and a second position or state (FIG. 13B). FIG. 14 is an exploded assembly view of the locking mechanism 104 according to one embodiment of the present invention.

The locking mechanism 104 includes an engagement pin 150 that selectively engages, for example, apertures formed in the inner and outer rails 101 and 105 of the first assembly 102 when such apertures are aligned. The locking mechanism 104 includes a lever 152 pivotally coupled with the pin 150. The lever 152 is configured to pivot or "rock" relative to the outer rails 105 of the first assembly 102 between the first and second positions or states. When the locking mechanism 104 is in the first state (as shown in FIG. 13A), the pin 150 is engaged with, or passes through, aligned apertures of the inner and outer rails 101 and 105 preventing the inner rails 101 from being slidingly displaced relative to the outer rails 105.

When a user desires to displace the inner and outer rails 101 and 105 of the first assembly 102 relative to each other, the user may, for example, grasp the lower portion of the lever 152 in their palm, grab a portion of the inner and outer rails 101 and 105 with their fingers, and squeeze so as to displace the lower portion of the lever 152 towards the outer rails 105 and thereby displace the upper portion of the lever 152 (and, thus, the pin 150) away from the inner and outer rails 101 and 105 such that it is disengaged from the aperture of at least the inner rails 101 and placing the locking mechanism in the second position (as shown in FIG. 13B).

The locking mechanism 104 may include additional components and features. For example, the locking mechanism 104 may include a detent or retaining mechanism 250 (shown schematically in FIG. 13D) to hold the lever 152 (and, thus, the pin 150) in either, or each, of the first or second positions until a desired level of force is applied to the lever 152. Thus, once disengaged (i.e., in the second position), the locking mechanism 104 may stay in that position or state until an appropriate level of force is applied inwardly to the upper portion of the lever (e.g., in a similar manner as was described with respect to applying a force to the lower portion of the lever 152 hereinabove) to cause the lever 152 to return to the first position.

As seen in FIG. 14, the locking mechanism 104 may include a bracket 153 configured to be coupled with, for example, an outer rail 105 of the first assembly 102, a pin or other connecting structure 154 pivotally coupling the lever 152 with the bracket 153, a pin or other connecting structure 155 pivotally coupling the lever 152 with the engagement pin 150, and a biasing 156 member that provides a desired biasing force between the lever 152 and the bracket 153. The locking mechanism 104 may also include a sleeve 157 through which the engagement pin 150 passes and which helps to facilitate alignment and engagement of the engagement pin 150 with the openings or apertures of the rails in the first assembly 102.

While the operation of the locking mechanism 104 is described above as a squeezing action by the user, other means of operating the locking mechanism may be employed. For example, a user may strike the lower portion of the lever 152 with a quick blow of sufficient force to displace it from the first position to the second position. Reengagement may be likewise accomplished.

The squeezing operation of the locking mechanism 104, or the application of force in a direction toward the inner and outer rails 101 and 105 of the first assembly 102 is more ergonomic and natural for a user as compared to conventional lock tabs and provides for more efficient use of the ladder 100.

As previously noted, the engagement pin 150 is pivotally or hingedly coupled with the lever 152 such that the pin 150 and the lever 152 do not keep the same geometric relationship between them when in the first and second positions. This enables the pin 150 to stay aligned with a specified axis. In some embodiments, the pin 150 may extend through the opening 252 or aperture of the inner rail 101 and into a space defined within an associated rung 103. In such a case, it may become important to maintain the pin 150 in alignment with the axis of the rung for satisfactory operation. To additionally assist with maintaining the alignment of the pin 150 with a specified axis (e.g., an axis extending through a rung 103 from one inner rail 101 to the other inner rail 101), a slot 159 may be formed in the handle 152 enabling the corresponding pin 155 to become displaced along a length of the slot 159 when the handle 152 is displaced from the its first position or state (FIG. 13A) to its second position or state (FIG. 13B).

Figure 15:
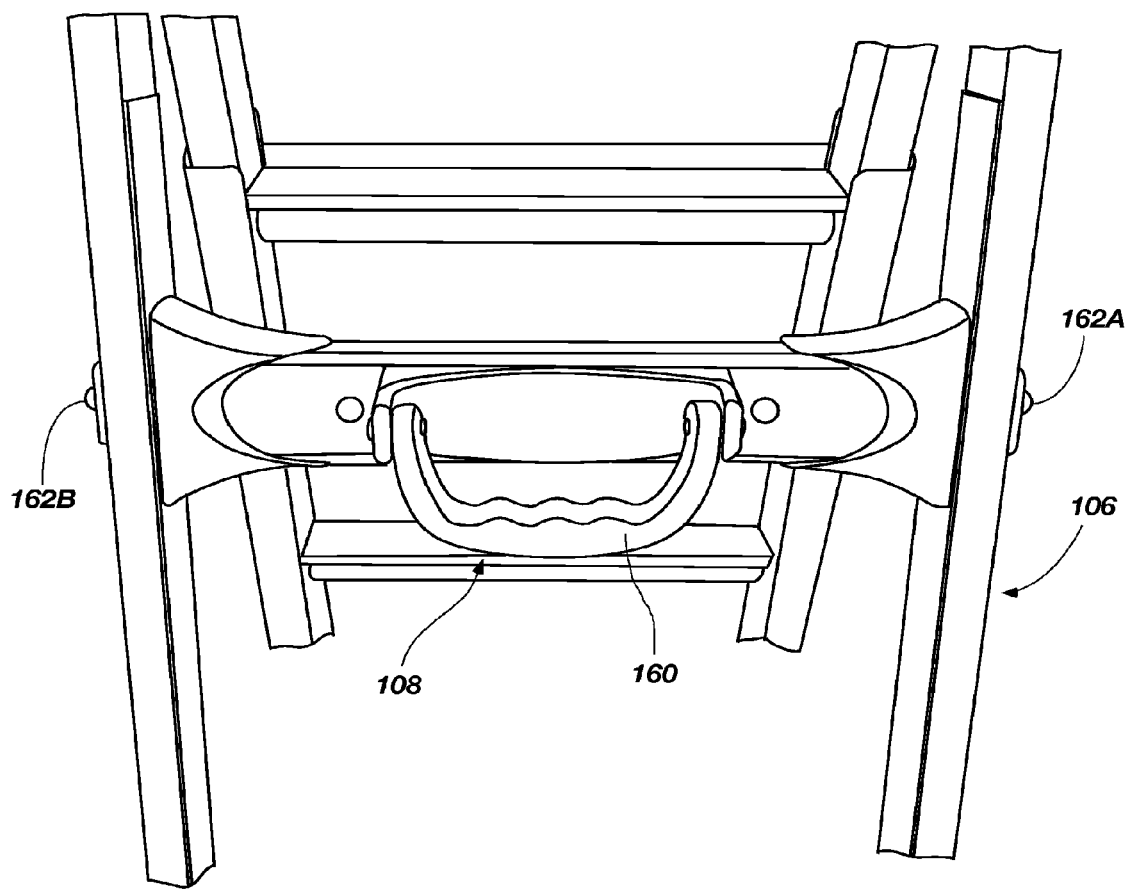
FIG. 15 is an enlarged view from the rear of the ladder shown in FIG. 1 showing another component or mechanism in accordance with the present invention.
Figure 16:
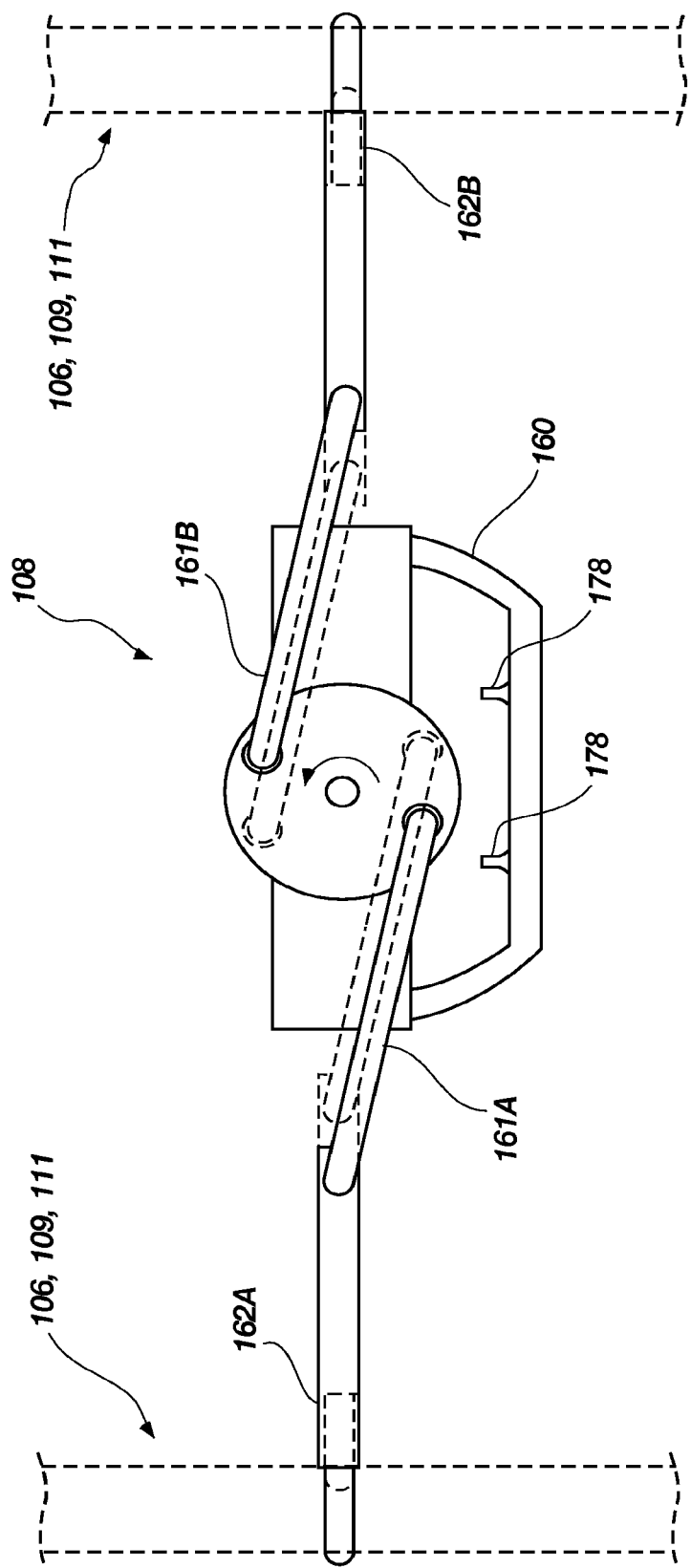
FIG. 16 shows operational aspects of the component or mechanism shown in FIG. 15.

Referring now to FIGS. 15 and 16, the locking mechanism 108 associated with the second assembly (see also FIGS. 1-4) is described. FIG. 16 shows an embodiment of the locking mechanism 108 with many portions of the second assembly 106 not shown and a few portions of the second assembly 106 indicated by dashed lines for purposes of clarity. The locking mechanism 108 includes a handle 160 rotatably coupled to a pair of links 161A and 161B, which are in turn pivotally coupled to a pair of pins 162A and 162B, respectively. When in a locked state, the pins 162A and 162B extend through aligned openings or apertures formed in the inner and outer rails 109 and 111 of the second assembly 106. When the handle 160 is rotated in a desired direction (e.g., clockwise), the pins 162A and 162B retract or become displaced inwardly toward the handle 160 such that they disengage openings in at least the outer rails 111 of the second assembly 106. This enables the inner 109 and outer rails 111 of the second assembly 106 to be slidingly displaced relative to one another. In one embodiment, the handle 106 and pins 162A and 162B may be biased towards the engaged position such that, when the pins 162A and 162B become aligned with apertures or openings in the outer rails, they automatically extend through such openings.

Figure 17:
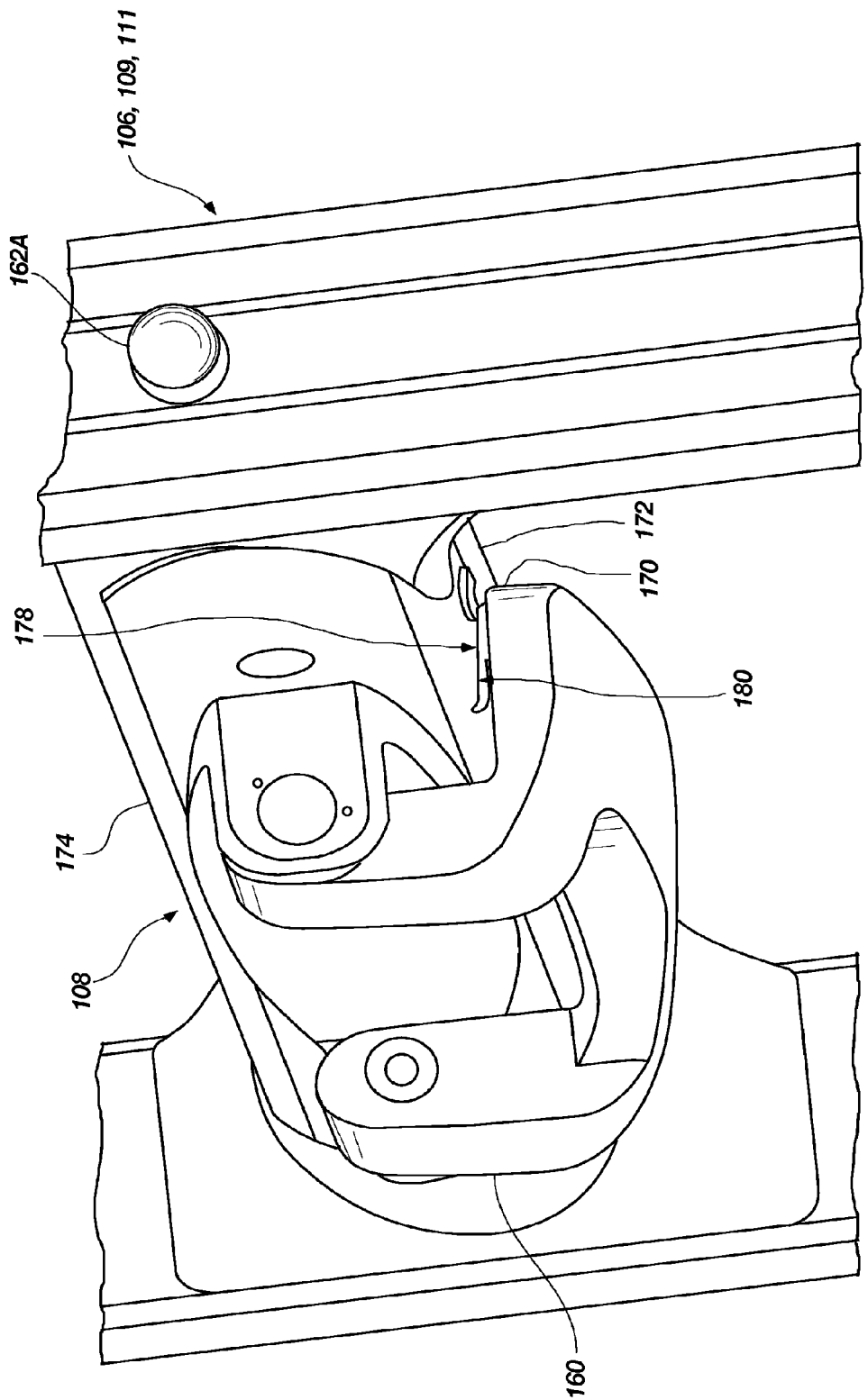
FIG. 17 is a perspective view, from below, of the component or mechanism shown in FIG. 15.

Referring briefly to FIG. 17, another embodiment of the handle 160 is shown which may include a shoulder portion 170 configured to abut the lower surface 172 of the cross-brace 174 associated with the locking mechanism. When in use (i.e., to disengage the pins 162A and 162B), the handle 160 pivots about pins 176 so that the shoulder portion 170 is displaced away from the cross-brace 174 and may then be used to actuate the locking mechanism 108 by rotating the handle in a desired direction as described above. When not in use, the shoulder portion 170 abuts the lower surface 172 of the cross-brace 174, it prevents the handle from rotating and consequently displacing the pins 162A and 162B. In other words, the shoulder portion 170 acts as a safety device to prevent actuation of the locking mechanism 108 and inadvertent adjustment of the inner rails 109 relative to the outer rails 111 of the second assembly 106.

In addition to the use of the shoulder portion 170, a pin 178 may be formed on, or coupled with, the shoulder portion 170. The pin 178 may be sized and configured to engage an opening or slot 180 formed on the lower surface 172 of the cross-brace 174. Engagement of the pin 178 with the slot 180 provides an additional locking action to prevent inadvertent rotation of the handle 160, and thus actuation of the locking mechanism 108, by helping to maintain the handle 160 in the position shown in FIG. 15, wherein the shoulder portion 170 abuts the lower surface 172 of the cross-brace 174.

Figure 18:
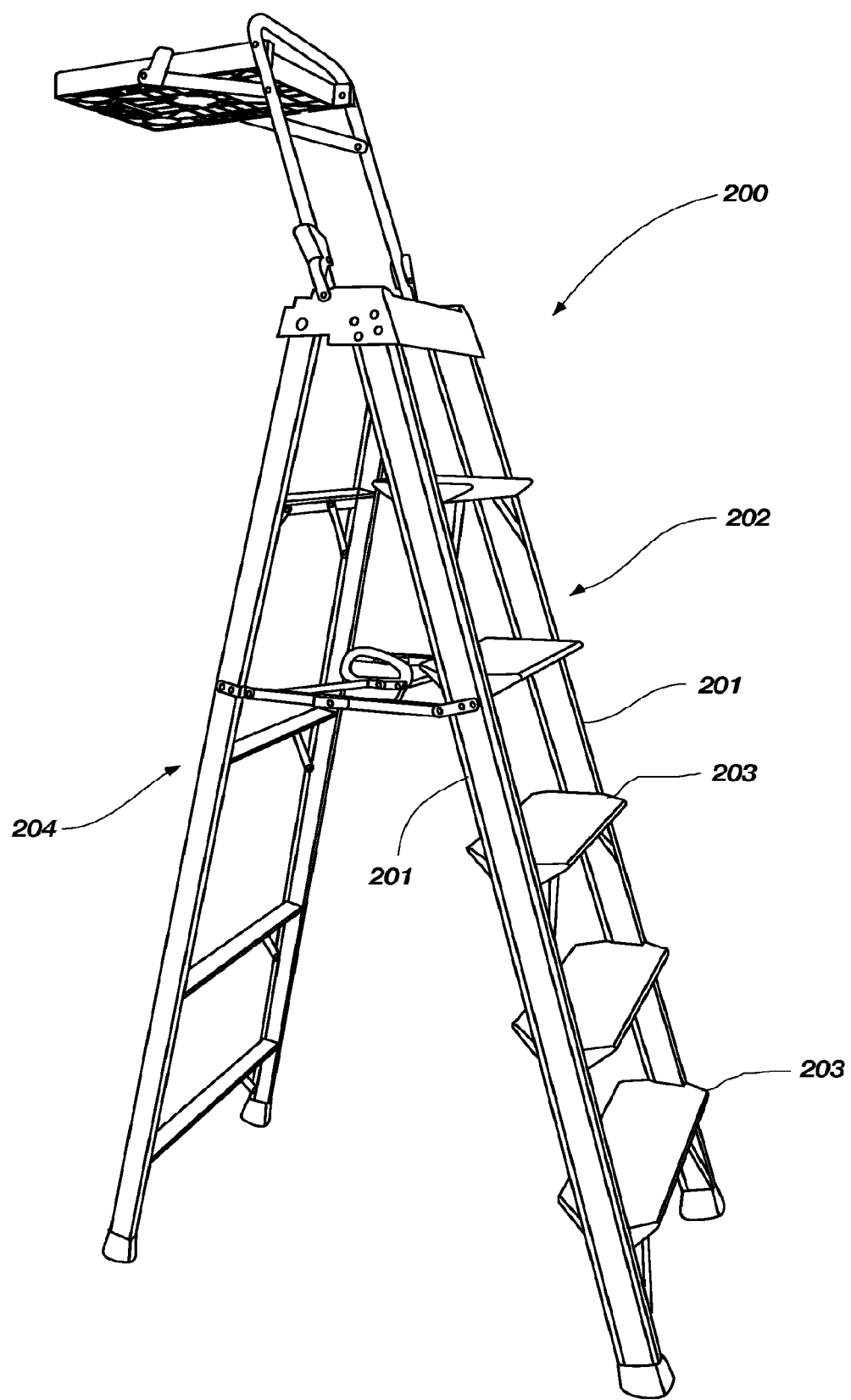
FIGS. 18 and 19 are perspective views of ladder in accordance with another embodiment of the present invention.
Figure 19:
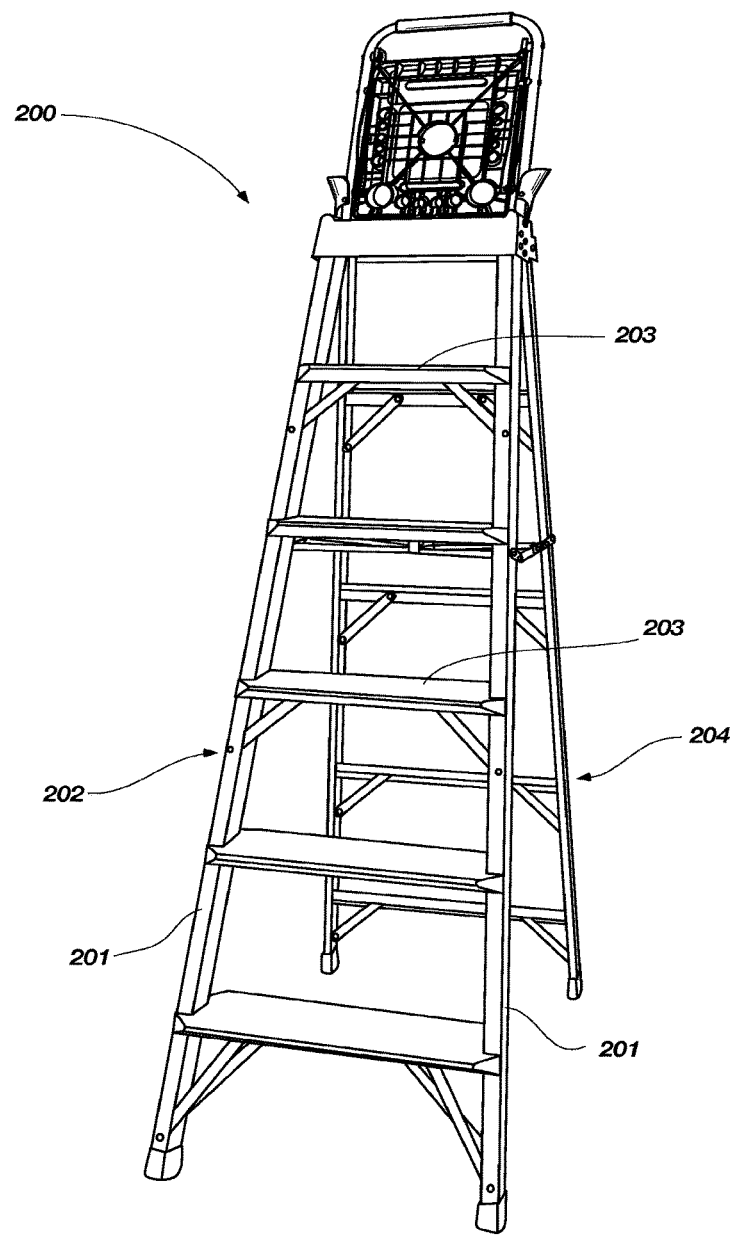

Referring now to FIGS. 18 and 19, another ladder 200 is shown. The ladder 200 does not include adjustable assemblies. Rather, the ladder 200 includes a first assembly 202 having a plurality of rungs 203 coupled to two spaced apart, non-adjustable (with respect to height) rails 201. The rungs 203 are configured with substantial depth that extends beyond the depth of the rails both inwardly (toward a second assembly 204) and outwardly (in the direction away from the second assembly 204) to provide a user with a larger surface area to stand on when working. In other words, the depth of the rungs 203 exceeds the depth of rails 201 and protrudes in each direction relative to the rails 201. The enlarged surface area of the rungs 203 can provide increased comfort, stability and safety in certain working conditions as compared to the rungs of more conventional stepladders. The ladder 200 may include other features and components similar to those described above with respect to the ladder 100 shown in FIGS. 1 through 4.

Figure 20:
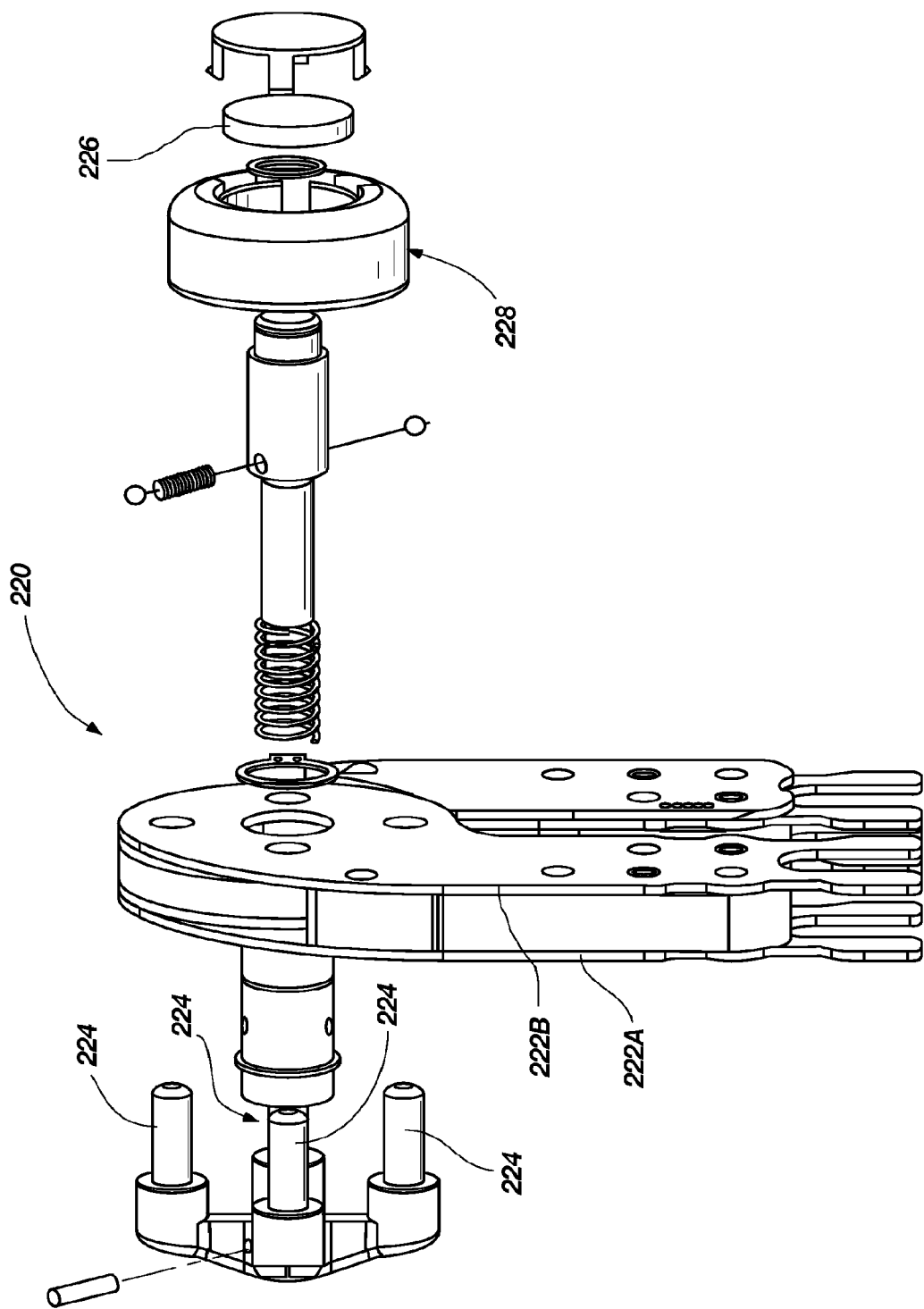
FIG. 20 is a hinge assembly that may be used with a ladder in accordance with an embodiment of the present invention.

Referring now to FIG. 20, a hinge assembly 220 is shown in accordance with an embodiment of the present invention. The hinge assembly 220 may be used in association with, for example, combination ladders similar to the hinge described in U.S. Pat. No. 4,407,045 to Boothe, the disclosure of which is incorporated by reference herein in its entirety. Such a hinge assembly 220 may be used on other types of ladders as well as will be appreciated by those of ordinary skill in the art. In one embodiment, the hinge assembly 220 includes multiple hinge components pivotally coupled with one another, wherein the outer hinge plates 222A and 222B of a hinge component are spaced further apart from one another as compared to those of previous hinge assemblies. Such spacing provides additional torsional stiffness and may enable the use of thinner, lighter hinge plates 222A and 222B. In one embodiment, the hinge assembly 220 further includes four locking pins 224 as compared to two locking pins in prior art assemblies. The use of four pins 224 strengthens the hinge assembly 220 and may increase the load rating of the ladder or otherwise provide for the use of lighter components such as hinge plates.

Figure 21:
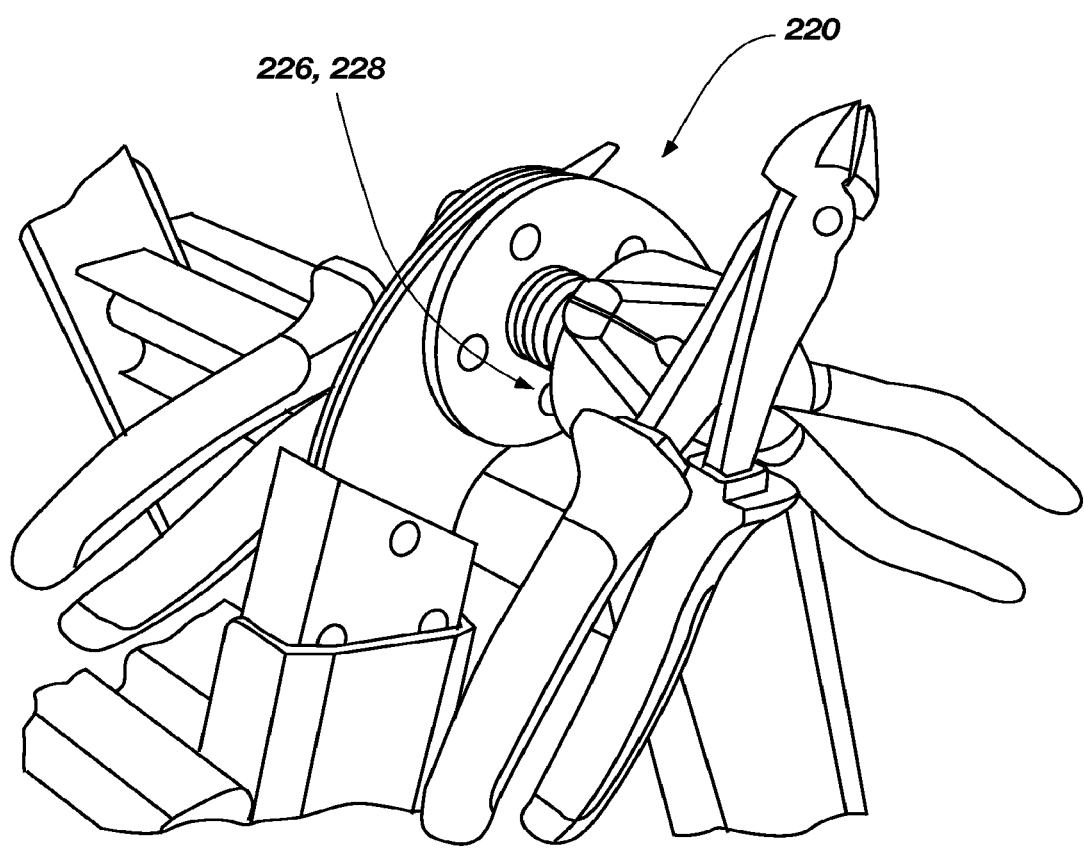
FIG. 21 is perspective view of a hinge assembly in accordance with an embodiment of the present invention.

The hinge assembly 220 further includes at least one magnet 226 which may, for example, be disposed within a cavity of an actuation button 228. The magnet 226 is configured to provide a sufficient magnetic force to hold a desired tool or other item on the side of the ladder (e.g., contiguous with the actuating button) without falling from the ladder. Thus, for example, a pair of pliers or wire cutters (or even multiple tools) may be magnetically coupled to the side of the ladder providing an easy, temporary storage of such tools or items during use of the ladder as shown in FIG. 21. In certain embodiments, additional magnets may be disposed along the sides of the rails of a ladder such that tools may be magnetically coupled therewith, and temporarily stored, at different elevational locations on the ladder depending, for example, what rung a user may be standing on for a given job.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A ladder comprising:
    a first assembly having a pair of inner rails and a pair of outer rails, the pair of inner rails being slidably coupled with the pair of outer rails; and
    at least one locking mechanism configured to pivot between a first position and a second position, the locking mechanism comprising:
        a bracket coupled to a first outer rail of the pair of outer rails,
        a lever pivotally coupled to the bracket by way of a pivot pin, the lever being biased toward the first position, the lever including a first portion extending from the pivot pin in a first direction, and the lever including a second portion extending from the pivot pin in a second direction extending away from the first portion,
        an engagement pin coupled to the lever, wherein the at least one locking mechanism is configured so that applying a force to the first portion of the lever in an inward direction towards the first outer rail causes the lever to rotate about the pivot pin from the first position to the second position causing the engagement pin to be displaced in an outward direction away from the first outer rail, the lever being configured to be selectively positioned between the first position and the second position, the first position being when the engagement pin passes through an opening in a first inner rail of the pair of inner rails which prevents relative movement between the inner and outer rails, the second position being when the engagement pin is retracted from the opening of the first inner rail to allow relative movement between the inner and outer rails, and
        a retaining mechanism configured to maintain the lever in the second position as the engagement pin is aligned with the opening in the first inner rail, the retaining mechanism configured to release the lever from the second position as a direct result of applying a predetermined force in the inward direction to the second portion of the lever.

2. The ladder of claim 1, further comprising at least one rung extending between and coupled directly to the pair of inner rails and at least one rung extending between and coupled directly to the pair of outer rails.

3. The ladder of claim 1, further comprising a biasing member positioned between the lever and the bracket, the biasing member being configured to bias the lever towards the first position.

4. The ladder of claim 1, wherein the at least one locking mechanism includes a first locking mechanism associated with the first outer rail of the pair of outer rails and a second locking mechanism associated with a second outer rail of the pair of outer rails.

5. The ladder of claim 1, further comprising:
a top cap coupled with the first assembly; and
a second assembly coupled with the top cap, the second assembly comprising an additional pair of outer rails and an additional pair of inner rails slidably coupled with the additional pair of outer rails, wherein at least one of the first assembly and the second assembly is pivotably coupled with the top cap.

6. The ladder of claim 5, further comprising a device configured to be selectively coupled to the top cap and maintained in at least a first deployed position and a second deployed position, the device including a rail and a tray movably coupled to the rail of the device, wherein, when in the first deployed position, the rail of the device extends from the top cap outwardly away from the ladder in a substantially horizontal direction when the ladder is in an orientation for intended use and wherein, when in the second deployed position, the rail of the device extends from the top cap in a direction that is at an acute angle relative to the first deployed position.

7. The ladder of claim 5, further comprising:
at least one additional locking mechanism configured to selectively engage the additional pair of outer rails and the additional pair of inner rails of the second rail assembly to lock the additional pair of outer rails relative to the additional pair of inner rails, the at least one additional locking mechanism comprising:
a pivoting structure disposed between the additional pair of inner rails;
a handle coupled with the pivoting structure;
a pair of pins associated with the pivoting structure, the pair of pins being selectively displaceable and configured to engage a first pair of openings in the pair of additional outer rails and a second pair of openings in the pair of additional inner rails when the first pair of openings are aligned with the second pair of openings to selectively prevent relative movement between the additional inner rails and the additional outer rails.

8. The ladder of claim 7, wherein the at least one additional locking mechanism is associated with a cross-brace, and wherein the handle is selectively positionable between a first handle position and a second handle position, the handle having a shoulder portion that abuts an undersurface of the cross-brace when in the first handle position.

9. The ladder of claim 8, further comprising at least one pin on the handle, the at least one pin being sized, located and configured to engage an opening in the undersurface of the cross-brace when the handle is in the first handle position.

* * * * *